(12) United States Patent
Shigyo

(10) Patent No.: US 11,047,581 B2
(45) Date of Patent: Jun. 29, 2021

(54) METHOD FOR CONSTRUCTING A WATER CIRCULATION DEVICE AND SCALE REMOVAL DEVICE

(71) Applicant: Mitsubishi Electric Corporation, Chiyoda-ku (JP)

(72) Inventor: Kazuhiro Shigyo, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/756,257

(22) PCT Filed: Dec. 6, 2017

(86) PCT No.: PCT/JP2017/043755
§ 371 (c)(1),
(2) Date: Apr. 15, 2020

(87) PCT Pub. No.: WO2019/111343
PCT Pub. Date: Jun. 13, 2019

(65) Prior Publication Data
US 2020/0240649 A1    Jul. 30, 2020

(51) Int. Cl.
*F24D 3/18*    (2006.01)
*F25B 30/02*    (2006.01)
(Continued)

(52) U.S. Cl.
CPC ............ *F24D 3/18* (2013.01); *F25B 30/02* (2013.01); *F24D 3/10* (2013.01); *F24D 19/1039* (2013.01);
(Continued)

(58) Field of Classification Search
CPC .. F25B 30/02; F25B 25/005; F25B 2339/047; F25B 2313/003; F24D 3/18; F24D 3/10;
(Continued)

(56) References Cited

U.S. PATENT DOCUMENTS 3,167,928 A * 2/1965 Swearingen .......... F25B 43/046
62/85
4,173,872 A * 11/1979 Amthor, Jr. ............... F24H 4/04
392/308
(Continued)

FOREIGN PATENT DOCUMENTS

EP    2 980 584 A1    2/2016
EP    3 141 837 A1    3/2017
(Continued)

OTHER PUBLICATIONS

Extended European Search Report dated Jan. 12, 2021 in corresponding European Patent Application No. 17934245.6, 10 pages.
(Continued)

*Primary Examiner* — Kun Kai Ma
(74) *Attorney, Agent, or Firm* — Oblon, McClelland, Maier & Neustadt, L.L.P.

(57) ABSTRACT

A method for constructing a water circulation device including a water circulation circuit that circulates water heat-exchanged with a refrigerant heated by a heat pump includes: installing a heater in the water circulation device in contact with the water; depositing scale from the water on the heater by heating the heater while circulating the water in the water circulation circuit; and removing the heater from the water circulation device after the depositing.

16 Claims, 17 Drawing Sheets

(51) Int. Cl.
*F24D 3/10* (2006.01)
*F24D 19/10* (2006.01)

(52) U.S. Cl.
CPC .. *F24D 2200/123* (2013.01); *F24D 2220/042* (2013.01); *F25B 2313/003* (2013.01)

(58) Field of Classification Search
CPC ........... F24D 19/1039; F24D 2200/123; F24D 19/0092; F28F 19/00; F28F 19/01; F24H 9/1818; F24H 4/02; F24H 9/0042; Y02B 30/12
See application file for complete search history.

(56) References Cited

U.S. PATENT DOCUMENTS

| | | | | |
|---|---|---|---|---|
| 5,992,505 A | * | 11/1999 | Moon | F28F 27/00 165/11.1 |
| 2005/0047284 A1 | * | 3/2005 | Takagi | C09K 5/10 369/13.14 |
| 2011/0061418 A1 | * | 3/2011 | Ishihara | F24H 4/04 62/324.3 |
| 2013/0180846 A1 | * | 7/2013 | Shibata | C02F 1/46104 204/196.02 |
| 2015/0047973 A1 | * | 2/2015 | Yoshida | C02F 1/46104 204/239 |
| 2016/0003486 A1 | * | 1/2016 | Minamisako | G08B 21/182 122/14.1 |
| 2017/0059185 A1 | * | 3/2017 | Suzuki | F25B 47/025 |

FOREIGN PATENT DOCUMENTS

| | | | |
|---|---|---|---|
| JP | 53-93775 | | 7/1978 |
| JP | 6-48795 Y2 | | 12/1994 |
| JP | 2010007889 A | * | 1/2010 |
| JP | 2010-261651 A | | 11/2010 |
| JP | 2010276303 A | * | 12/2010 |
| JP | 2011137622 A | * | 7/2011 |
| JP | 2011-226697 A | | 11/2011 |
| JP | 2011226697 A | * | 11/2011 |
| JP | 2013130308 A | * | 7/2013 |
| JP | 2015-151436 A | | 9/2015 |
| JP | 2015-157883 A | | 9/2015 |
| JP | 2015-161437 A | | 9/2015 |
| JP | 6029744 B2 | | 11/2016 |
| WO | WO 2011/045878 A1 | | 4/2011 |
| WO | WO-2012073380 A1 | * | 6/2012 ............... F28G 7/00 |

OTHER PUBLICATIONS

International Search Report dated Feb. 20, 2018 in PCT/JP2017/043755 filed on Dec. 6, 2017, 2 pages.

* cited by examiner

METHOD FOR CONSTRUCTING A WATER CIRCULATION DEVICE AND SCALE REMOVAL DEVICE

TECHNICAL FIELD

The present invention relates to, for example, a method for constructing a water circulation device used in a hot water heating system and a scale removal device that removes scale in the water circulation device.

BACKGROUND ART

In recent years, a heat pump type hot water heating system in which a heat pump unit is used as a heat source has been proposed. A heat pump type hot water heating system generates hot water by exchanging heat between a heat pump unit installed outdoors and a water circulation device installed indoors, and radiates the heat into a room by circulating the hot water into a water circulation circuit included in the water circulation device.

When the heat is exchanged between the heat pump unit and the water circulation device, solubility of a calcium component and a silica component contained in water of the water circulation circuit decreases with increasing temperature. For this reason, solid scale (water-formed deposits) such as $CaCO_3$ and $SiO_2$ is deposited in the water of the water circulation circuit, and adheres to inner walls of a heat exchanger and a pipe. The scale adhering to the inner walls of the heat exchanger and the pipe may obstruct circulation of the water to increase a pressure loss of the device, or, in the worst case, the heat exchanger or the pipe is blocked to cause failure of the water circulation device.

Japanese Patent Laying-Open No. 2015-161436 (PTL 1) discloses a hot water heater including a calcium removal device that prevents the scale from adhering to the inner walls of the heat exchanger and the pipe. The calcium removal device heats the water in the water circulation circuit to 60° C. or higher using a deposition heater, and removes the calcium component dissolved in the water by depositing the calcium component on the deposition heater.

CITATION LIST

Patent Literature

PTL 1: Japanese Patent Laying-Open No. 2015-161436

SUMMARY OF INVENTION

Technical Problem

However, in the hot water heater described in Japanese Patent Laying-Open No. 2015-161436, the scale adhering to a surface of the deposition heater peels off during use of the hot water heater, and flows out into the water circulation circuit, and sometimes there is a possibility of causing failure of a mechanism element such as a valve and a pump.

The present disclosure has been made to solve the above problem, and an object of the present disclosure is to provide a water circulation device construction method and a scale removal device that can reduce the failure caused by the scale in the water circulation circuit.

Solution to Problem

According to one aspect of the present disclosure, a construction method is a method for constructing a water circulation device including a water circulation circuit that circulates water heat-exchanged with a refrigerant heated by a heat pump. The construction method includes the steps of: installing a heater in the water circulation device in contact with the water; depositing scale from the water on the heater by heating the heater while circulating the water in the water circulation circuit; and removing the heater from the water circulation device after the depositing.

According to another aspect of the present disclosure, a scale removal device removes scale of water circulating in a water circulation circuit. A vertically upward hole that can be opened and closed with a first lid and a second lid is formed in the water circulation circuit. The scale removal device includes the second lid and a heater. The scale removal device switches between a first state in which the hole is closed with the second lid while the first lid and the heater are disposed in the water circulation circuit and a second state in which the hole is closed with the first lid while the heater and the second lid are disposed outside the water circulation circuit.

Advantageous Effects of Invention

The failure caused by the scale in the water circulation circuit can be prevented in the water circulation device construction method and the scale removal device of aspects of the present disclosure.

DESCRIPTION OF EMBODIMENTS

Figure 1:
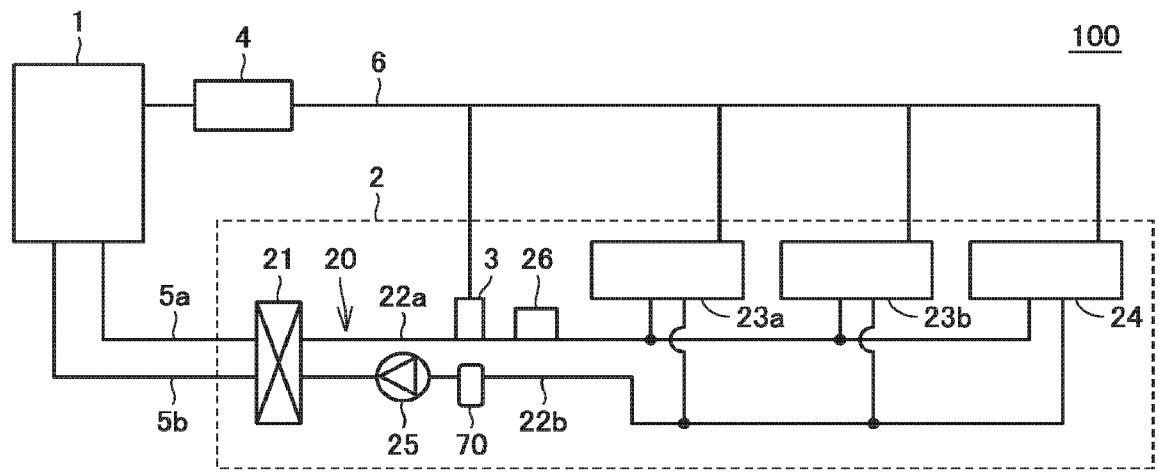
FIG. 1 is a diagram illustrating a schematic configuration of a hot water heating system according to a first embodiment.

Hereinafter, embodiments of the present invention will be described in detail with reference to the drawings. Although a plurality of embodiments will be described below, it is planned from the beginning of the application to that the configurations of the embodiments are appropriately combined. In the drawings, the same or corresponding portion is denoted by the same reference numeral, and the description thereof will not be repeated. Furthermore, the forms of the components illustrated in the whole description are merely examples, and the present invention is not limited to these descriptions.

First Embodiment (Configuration of Hot Water Heating System)

Figure 2:
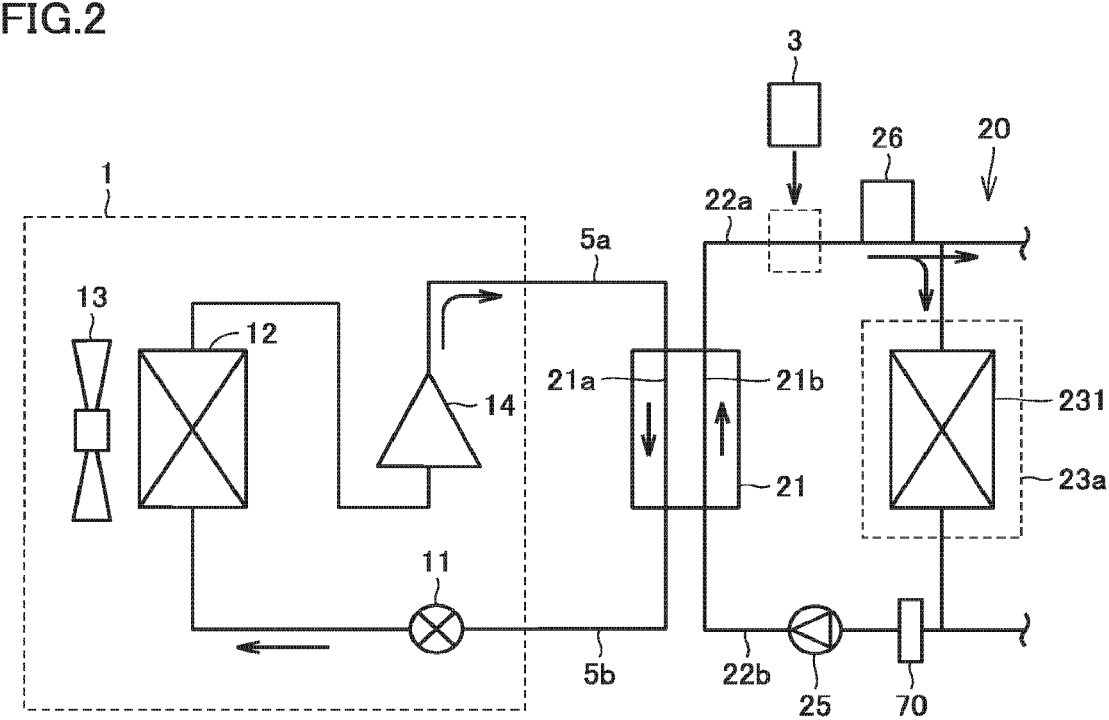
FIG. 2 is a diagram illustrating an internal configuration of a heat pump unit and an indoor unit provided in the hot water heating system of FIG. 1.

With reference to FIGS. 1 and 2, a configuration of a hot water heating system 100 according to a first embodiment will be described. FIG. 1 is a diagram illustrating a schematic configuration of the hot water heating system of the first embodiment. FIG. 2 is a diagram illustrating an internal configuration of a heat pump unit 1 and an indoor unit 23a included in the hot water heating system of FIG. 1. As illustrated in FIG. 1, hot water heating system 100 includes heat pump unit 1, a water circulation device 2, a scale removal device 3, a control device 4, refrigerant pipes 5a, 5b, and a communication line 6.

Heat pump unit 1 is a heat source that heats the refrigerant. As illustrated in FIG. 2, heat pump unit 1 includes a pressure reducing valve 11, an evaporator 12, a fan 13, and a compressor 14. Pressure reducing valve 11 reduces a pressure of the refrigerant flowing through refrigerant pipe 5b. Evaporator 12 performs heat exchange between the refrigerant in which the pressure is reduced by pressure reducing valve 11 and outdoor air, and evaporates the refrigerant. Compressor 14 compresses the refrigerant generated by evaporator 12, and discharges the high-temperature, high-pressure refrigerant in a gas-phase state to refrigerant pipe 5a. Fan 13 blows outdoor0 air toward evaporator 12.

Refrigerant pipe 5a connects one of ports of a refrigerant flow channel 21a in a heat source-side heat exchanger 21 included in water circulation device 2 and a discharge port of compressor 14. Refrigerant pipe 5b connects the other port of refrigerant flow channel 21a and pressure reducing valve 11. Consequently, the refrigerant sequentially circulates compressor 14, refrigerant pipe 5a, refrigerant flow channel 21a of heat source-side heat exchanger 21, refrigerant pipe 5b, pressure reducing valve 11, and evaporator 12.

As illustrated in FIGS. 1 and 2, water circulation device 2 includes a water circulation circuit 20 that circulates water heat-exchanged with the refrigerant heated by heat pump unit 1 and a strainer 70. Water circulation circuit 20 includes heat source-side heat exchanger 21, water pipes 22a, 22b, indoor units 23a, 23b, a radiator 24, a pump 25, and a tank 26.

Heat source-side heat exchanger 21 includes refrigerant flow channel 21a and a water flow channel 21b, and performs the heat exchange between the refrigerant flowing through refrigerant flow channel 21a and the water flowing through water flow channel 21b. The refrigerant condenses in heat source-side heat exchanger 21. The heat generated by the condensation of the refrigerant is transferred to the water.

Indoor units 23a, 23b and radiator 24 are connected in parallel to heat source-side heat exchanger 21 by water pipes 22a, 22b. Indoor units 23a, 23b include a use-side heat exchanger 231. Use-side heat exchanger 231 performs the heat exchange between the water (hot water) circulating in water circulation circuit 20 and indoor air. Radiator 24 radiates the heat from the water (hot water) circulating in water circulation circuit 20 to outside air.

Water pipe 22a connects one of ports of water flow channel 21b of heat source-side heat exchanger 21 and indoor units 23a, 23b and radiator 24. Water pipe 22b connects the other port of water flow channel 21b and indoor units 23a, 23b and radiator 24.

Pump 25 is provided in the middle of water pipe 22b, and causes the water to flow from indoor units 23a, 23b and radiator 24 toward heat source-side heat exchanger 21. Consequently, the water sequentially circulates water flow channel 21b of heat source-side heat exchanger 21, water pipe 22a, use-side heat exchanger 231 or radiator 24, and water pipe 22b.

Tank 26 is provided in the middle of water pipe 22a, absorbs a volume change due to a temperature change of the water circulating in water circulation circuit 20, and supplements the water when an amount of water in water circulation circuit 20 decreases for some reason. Further, tank 26 removes air bubbles mixed in water circulation circuit 20.

Strainer 70 is provided in the middle of water pipe 22b and on an upstream side of pump 25. Strainer 70 physically catches metal powder, pebbles, and plastic pieces that are foreign matters other than the scale, and prevents damage of pump 25 and heat source-side heat exchanger 21.

Scale removal device 3 includes a heater, and is configured to take a first state in which the heater is installed in water circulation device 2 and a second state in which the heater is removed from water circulation device 2. Scale removal device 3 in the first state removes a calcium component and a silica component contained in the water circulating in water circulation circuit 20, thereby preventing problems such as an increase in pressure loss due to scale deposition in heat source-side heat exchanger 21 or water circulation circuit 20. Scale removal device 3 in the second state can prevent the scale from flowing out of scale removal device 3 to water circulation circuit 20. Further, the flow of water in water circulation circuit 20 is not prevented by scale removal device 3. Details of scale removal device 3 will be described later.

Control device 4 controls an operating condition of heat pump unit 1 based on an indoor temperature measured by a temperature sensor (not illustrated) provided in each of indoor units 23a, 23b and radiator 24. When scale removal device 3 is in the first state, control device 4 controls the operating conditions of scale removal device 3 and heat pump unit 1. Control device 4 is connected to heat pump unit 1, scale removal device 3, indoor units 23a, 23b, and radiator 24 through communication line 6.

(Structure of Scale Removal Device)

Figure 3:
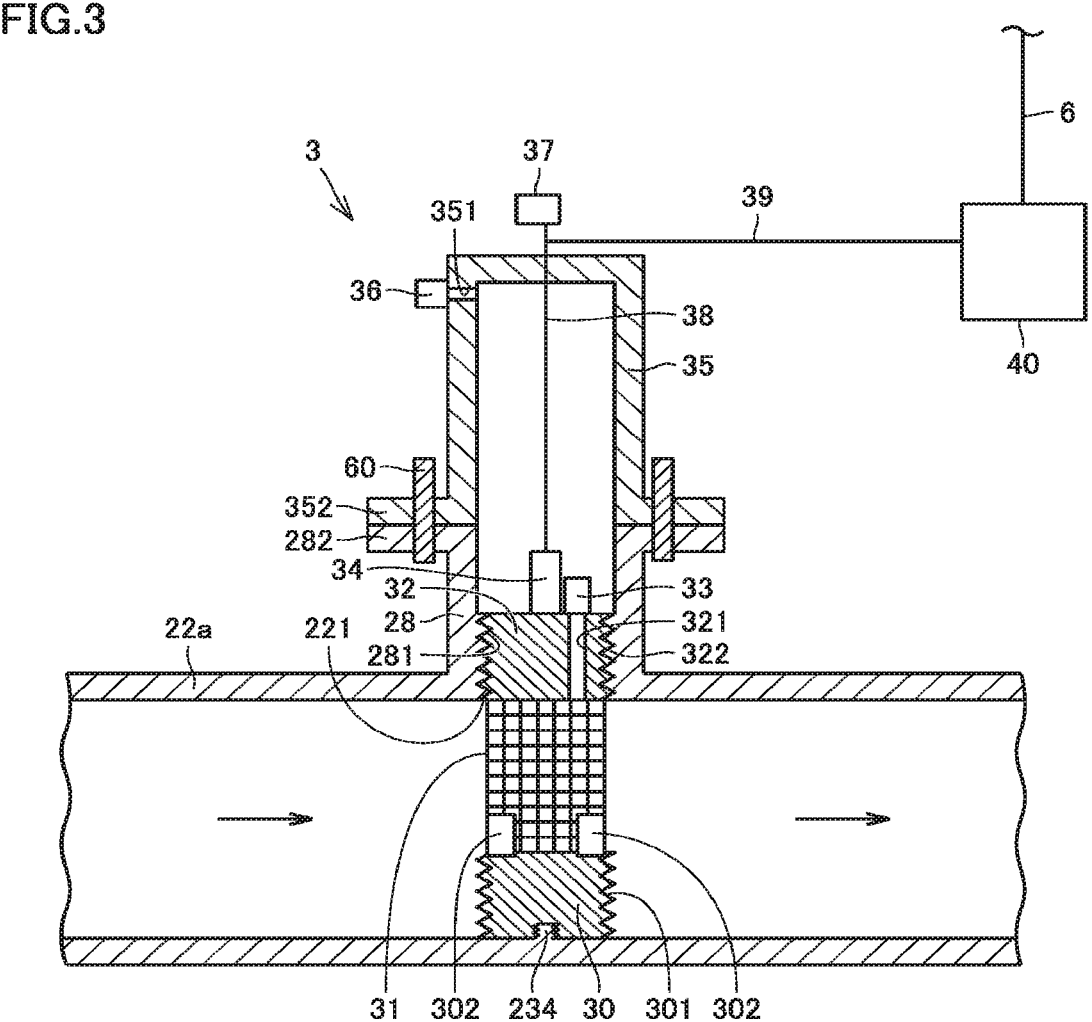
FIG. 3 is a sectional view illustrating a scale removal device in a first state.
Figure 4:
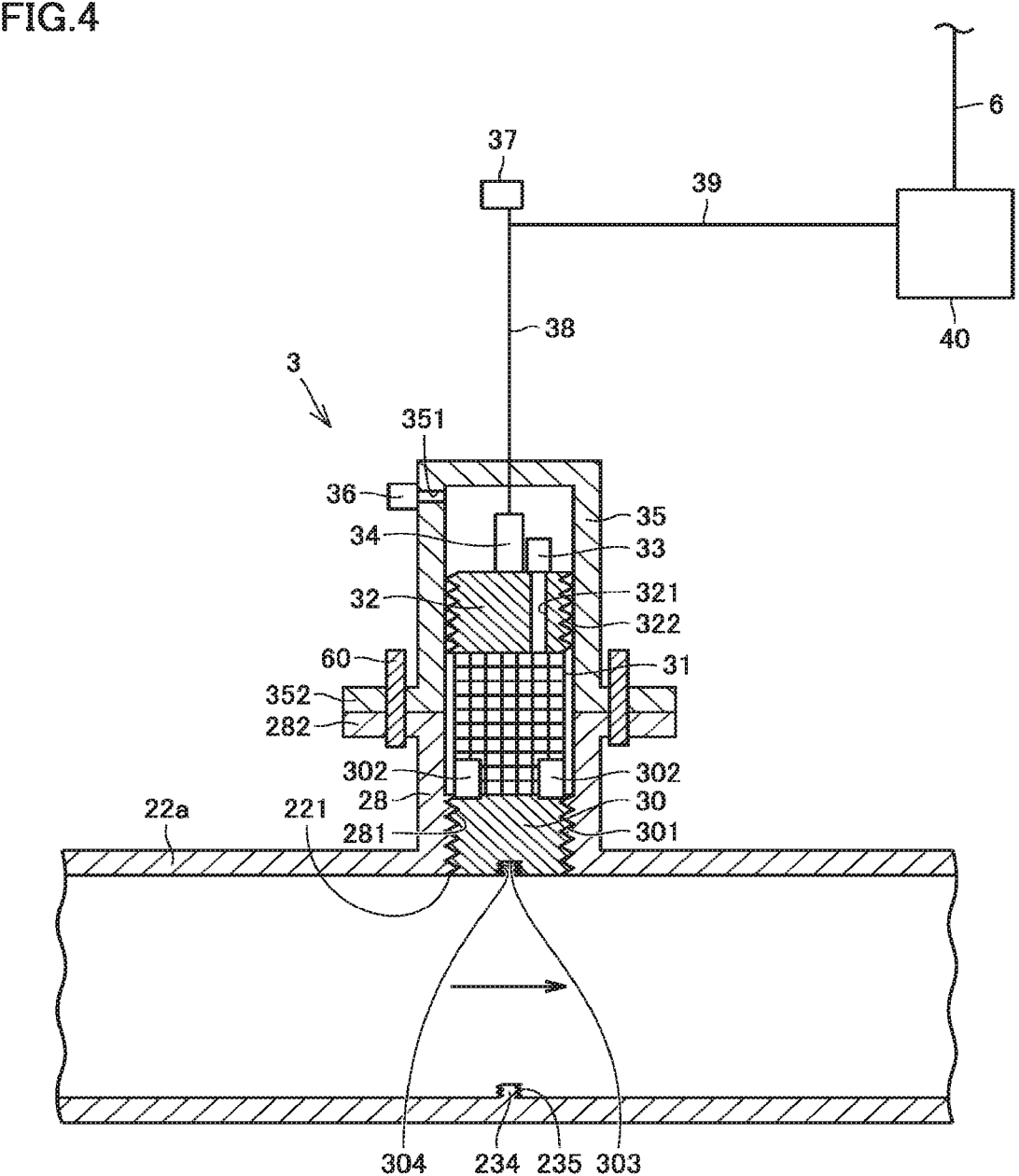
FIG. 4 is a sectional view illustrating the scale removal device during a transition from the first state to a second state.
Figure 5:
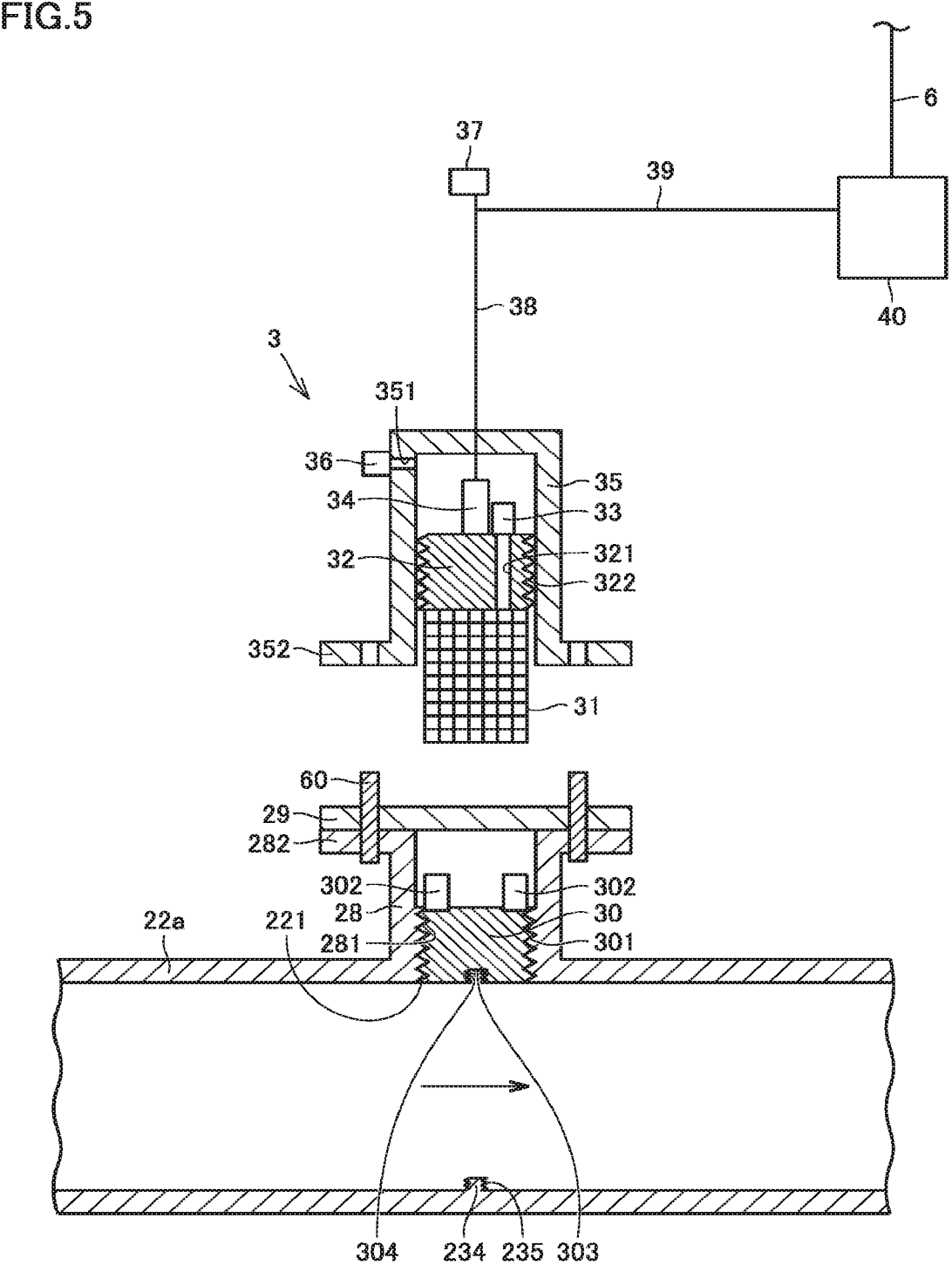
FIG. 5 is a sectional view illustrating the scale removal device in the second state.

FIG. 3 is a sectional view illustrating scale removal device 3 in the first state. FIG. 4 is a sectional view illustrating scale removal device 3 during a transition from the first state to the second state (or during a transition from the second state to the first state). FIG. 5 is a sectional view illustrating scale removal device 3 in the second state.

As illustrated in FIGS. 3 to 5, a vertically upward hole 221 is formed in water pipe 22a, and an introduction pipe 28 communicating with hole 221 is connected to water pipe 22a. Hole 221 can be opened and closed by a lower pipe lid 30. A female screw 281 is formed in a lower portion of an inner circumferential surface of introduction pipe 28. Introduction pipe 28 includes a flange 282 in an upper portion thereof.

An inwardly protruding fixing unit 234 is formed in a portion opposite to hole 221 in an inner wall surface of water pipe 22a. A male screw 235 is formed on an outer circumferential surface of fixing unit 234.

Scale removal device 3 includes a heater 31, an upper pipe lid 32, an air release valve 33, a controller 34, a guide member 35, a check valve 36, an operation lever 37, a connecting rod 38, and a wiring line 39, and a power supply 40. Scale removal device 3 is attachable to lower pipe lid 30.

Lower pipe lid 30 has a columnar shape, and can open and close hole 221. A male screw 301 that can be screwed in female screw 281 formed in introduction pipe 28 is formed on the outer circumferential surface of lower pipe lid 30. A recess 303 (see FIGS. 4 and 5) is formed on a bottom surface of lower pipe lid 30, and a female screw 304 that can be screwed with male screw 235 formed on fixing unit 234 is formed on the inner circumferential surface of recess 303. A joint 302 that fixes heater 31 is attached to the upper surface of lower pipe lid 30.

Heater 31 is made of metal or ceramic, and heats by energization. Heater 31 has a flat net shape. A lower end of heater 31 is attachable to lower pipe lid 30 by joint 302.

Upper pipe lid 32 has a columnar shape, and is attached to the upper end of heater 31. A male screw 322 that can be screwed in female screw 281 formed in introduction pipe 28 is formed on the outer circumferential surface of upper pipe lid 32. Upper pipe lid 32 has an air vent 321 extending in an axial direction. Air release valve 33 is provided on an upper surface of upper pipe lid 32 so as to cover air vent 321. Air release valve 33 is an electromagnetic valve, and performs opening and closing operations according to an instruction from control device 4 through wiring line 39.

Controller 34 includes a temperature sensor that measures a temperature of heater 31, and controls supply of power to heater 31 such that the measured temperature is equal to a specified temperature.

Heater 31, upper pipe lid 32, air release valve 33, and controller 34 are integrated. Guide member 35 has a cylindrical shape in which an upper end is closed, and accommodates integrated heater 31, upper pipe lid 32, air release valve 33, and controller 34 in an internal space. Guide member 35 includes a flange 352 at a lower end. Flange 352 of guide member 35 and flange 282 of introduction pipe 28 can be connected to each other by a set screw 60. The internal space of guide member 35 is tightly closed by connecting flange 352 of guide member 35 and flange 282 of introduction pipe 28. A through-hole 351 is formed in guide member 35, and check valve 36 that covers through-hole 351 is provided on an outer surface of guide member 35.

Connecting rod 38 penetrates an upper wall of guide member 35, and connects controller 34 disposed in the internal space of guide member 35 and operation lever 37 disposed outside guide member 35. Consequently, heater 31, upper pipe lid 32, air release valve 33, and controller 34 can be moved by operating operation lever 37. A gap between guide member 35 and connecting rod 38 is sealed with a rubber gasket. Connecting rod 38 has a cylindrical shape, and wiring line 39 is passed in connecting rod 38.

Wiring line 39 connects power supply 40 and controller 34. Power supply 40 supplies the power to heater 31 through wiring line 39 and controller 34 according to an instruction from control device 4. Further, power supply 40 may output a signal from control device 4 to controller 34.

(Water Circulation Device Construction Method)
(Overall Flow)

Figure 6:
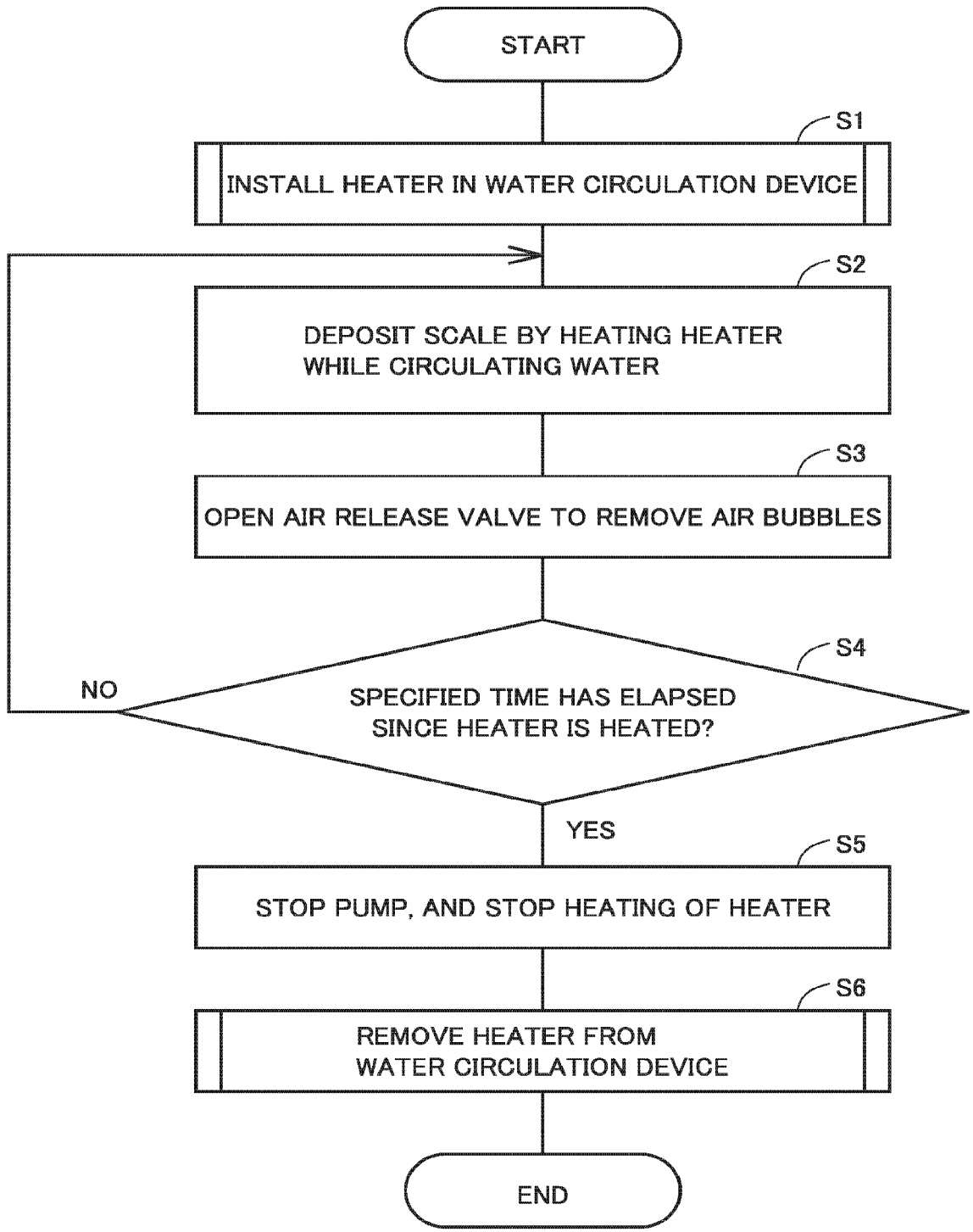
FIG. 6 is a flowchart illustrating a method for constructing a water circulation device.

With reference to FIG. 6, a method for constructing water circulation device 2 will be described below. FIG. 6 is a flowchart illustrating the method for constructing water circulation device 2. Heater 31 of scale removal device 3 is installed in water pipe 22a of water circulation device 2 with water circulation circuit 20 filled with the water (step S1). This brings scale removal device 3 to the first state in FIG. 3. Filling water circulation circuit 20 with the water may be performed after step S1.

In step S2, control device 4 controls pump 25 to circulate the water in water circulation circuit 20, and causes power supply 40 to supply the power to heater 31. Heater 31 is thus heated to 60° C. or higher, and the calcium component and the silica component contained in the water are deposited on heater 31 as the scale. At this point, preferably control device 4 operates heat pump unit 1 such that the refrigerant condenses in heat source-side heat exchanger 21 at a temperature lower than 60° C., and then heats heater 31. Preferably control device 4 operates heat pump unit 1 such that the refrigerant condenses in heat source-side heat exchanger 21 at a temperature lower than 60° C. even while heater 31 is heated. This enables the temperature of the water in water circulation circuit 20 to be raised in a short time by the heat received from the refrigerant and the heat from heater 31. As the temperature of the water is raised, solubility per unit volume of the calcium component and the silica component in the water decreases, and the scale of $CaCO_3$ and $SiO_2$ is deposited on heater 31. The deposited scale adheres to the surface of heater 31.

Air release valve 33 is opened for a short time to remove the air bubbles generated from the water (step S3). An air component, such as oxygen and nitrogen, which is dissolved in the water, is generated as the air bubbles near the surface of heater 31 at the same time as the scale is deposited. The bubbles rise along heater 31 by buoyancy, and gather around air release valve 33 through air vent 321 formed in upper pipe lid 32. For this reason, step S3 is performed when the air bubbles accumulate to some extent. Step S3 is performed as needed, and may be omitted when the amount of generated air bubbles is small.

Subsequently, whether an elapsed time from a heating start of heater 31 exceeds a specified time is determined (step S4). Time necessary for the removal of the calcium component and the silica component contained in the water circulating in water circulation circuit 20 as the scale is previously set as the specified time. When the elapsed time from the heating start of heater 31 does not exceed the specified time (NO in step S4), steps S2 and S3 are repeated. When the elapsed time from the heating start of heater 31 exceeds the specified time (YES in step S4), control device 4 stops pump 25 and stops the supply of the power to heater 31 (step S5). When heat pump unit 1 is operated in step S2, control device 4 stops the operation of heat pump unit 1.

Subsequently, heater 31 is removed from water circulation device 2 (in this case, water pipe 22a) (step S6). This brings scale removal device 3 to the second state in FIG. 5. The construction of water circulation device 2 is completed in step S6, and use of water circulation device 2 is started.

(Process of Installing Heater in Water Circulation Device)

Figure 7:
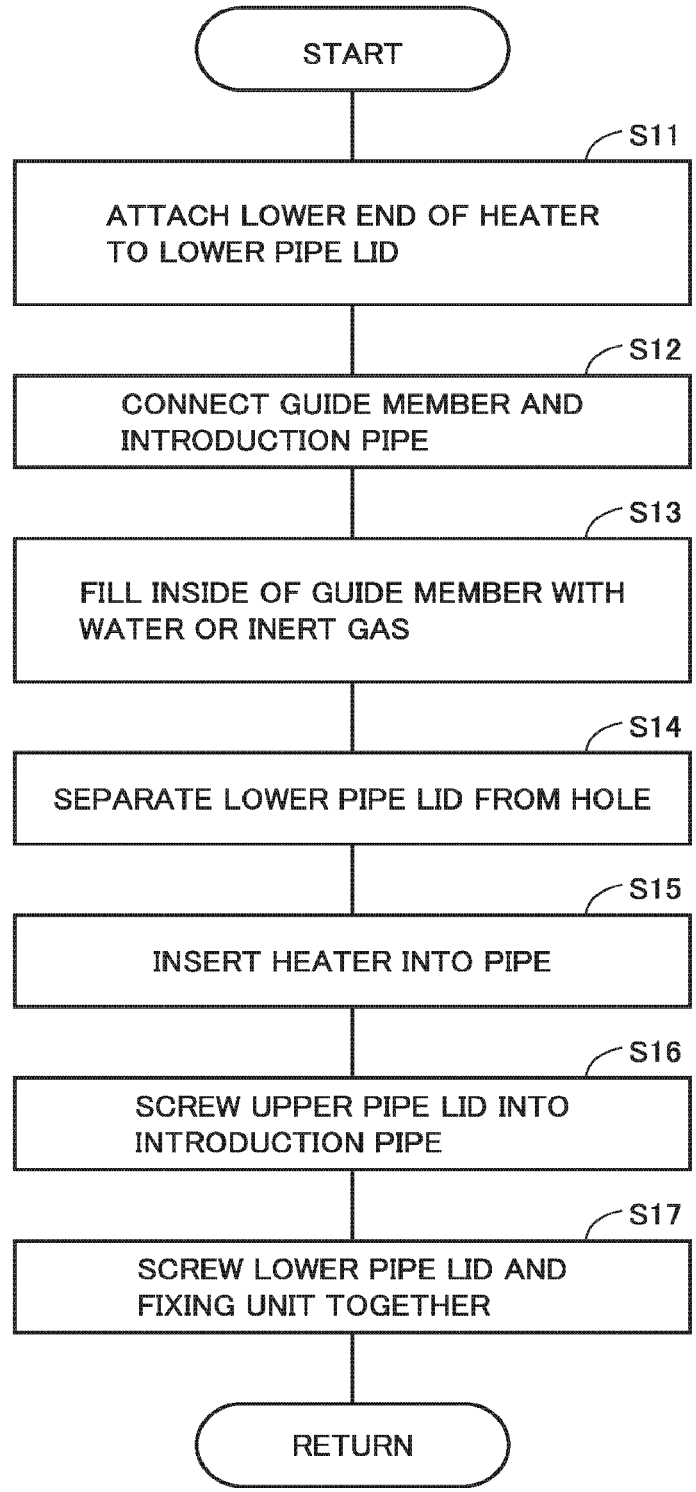
FIG. 7 is a flowchart illustrating a subroutine of step S1 in FIG. 6.

With reference to FIG. 7, details of step S1 will be described below. FIG. 7 is a flowchart illustrating a subroutine of step S1 in FIG. 6. Lower pipe lid 30 is previously screwed in introduction pipe 28. When scale removal device 3 is in the second state in FIG. 5 while hole 221 is closed by lower pipe lid 30, the lower end of heater 31 is inserted into joint 302, and heater 31 is attached to lower pipe lid 30 (step S11). At this point, a plate member 29 is removed from introduction pipe 28 when introduction pipe 28 is closed by plate member 29. Joint 302 sandwiches heater 31 when heater 31 is inserted from above, thereby fixing heater 31. In this way, controller 34, air release valve 33, upper pipe lid 32, heater 31, and lower pipe lid 30 are integrated. As a result, controller 34, air release valve 33, upper pipe lid 32, heater 31, and lower pipe lid 30 rotate integrally by rotating operation lever 37. Further, controller 34, air release valve 33, upper pipe lid 32, heater 31, and lower pipe lid 30 move integrally in a vertical direction by vertically sliding operation lever 37.

Subsequently, flange 282 of introduction pipe 28 and flange 352 of guide member 35 are connected to each other by a set screw (step S12). The internal space of guide member 35 is thus sealed (see FIG. 4). Subsequently, water or an inert gas such as nitrogen is injected into the internal space of guide member 35 through check valve 36 and through-hole 351 to fill the internal space of guide member 35 with the water or the inert gas (step S13). At this point, a portion below upper pipe lid 32 is also filled with the water or the inert gas by putting air release valve 33 into the open state. The water or the inert gas is supplied to the internal space of guide member 35 such that the pressure of the water or inert gas occupying the internal space of guide member 35 is equal to or higher than the water pressure of water pipe 22a by 5% to 10%. This prevents the pressure from being applied from water pipe 22a to the side of guide member 35. Because the internal space of guide member 35 is sealed, the water or inert gas filling the internal space does not leak to the outside.

Subsequently, operation lever 37 is rotated to release the screwing engagement of lower pipe lid 30 and introduction pipe 28, and lower pipe lid 30 is separated from hole 221 (step S14). Subsequently, lower pipe lid 30 and heater 31 are inserted into water pipe 22a by depressing operation lever 37 (step S15). Subsequently, operation lever 37 is rotated to screw upper pipe lid 32 into introduction pipe 28 (step S16). Consequently, hole 221 formed in water pipe 22a is closed by upper pipe lid 32.

Operation lever 37 is further rotated to screw recess 303 formed on the bottom surface of lower pipe lid 30 and fixing unit 234 formed on the inner wall surface of water pipe 22a together (step S17). Lower pipe lid 30 is thus fixed to water pipe 22a. By performing steps S11 to S17, scale removal device 3 changes from the second state (see FIG. 5) to the first state (see FIG. 3) in which heater 31 is placed in water circulation device 2 in contact with the water.

(Process of Removing Heater From Water Circulation Device)

Figure 8:
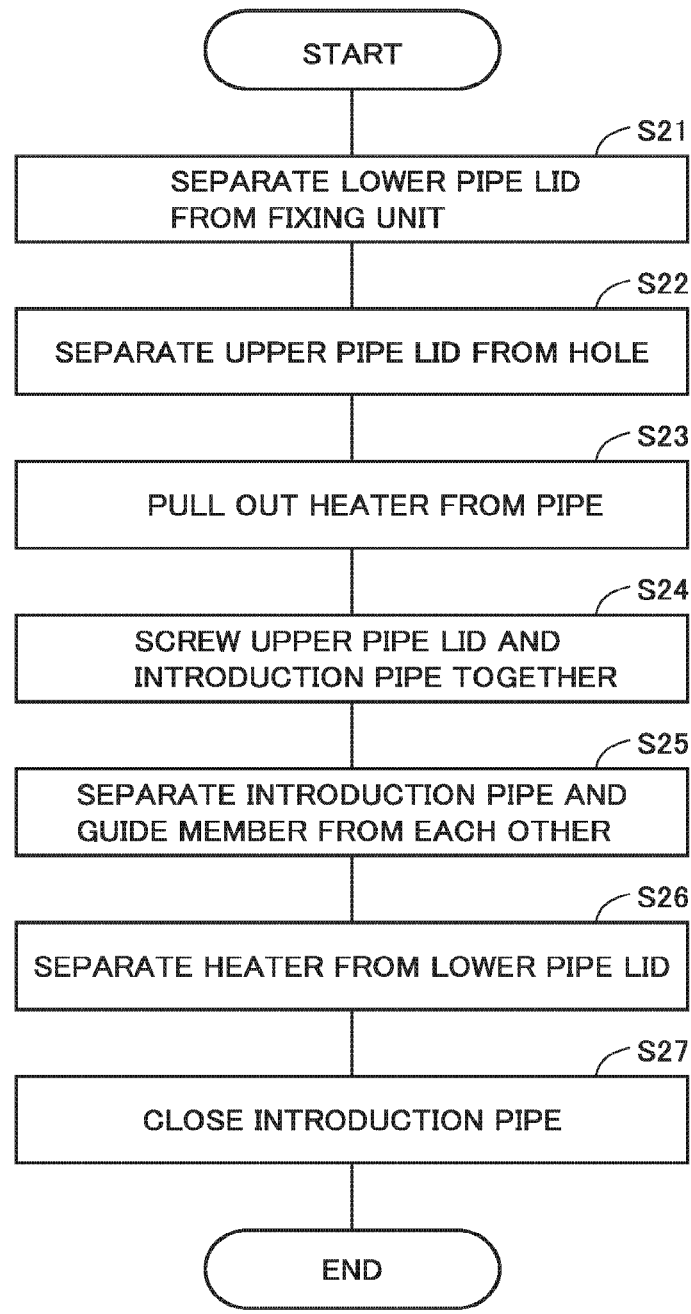
FIG. 8 is a flowchart illustrating a subroutine of step S6 in FIG. 6.

With reference to FIG. 8, details of step S6 will be described below. FIG. 8 is a flowchart illustrating a subroutine of step S6 in FIG. 6. When scale removal device 3 is in the first state of FIG. 3, operation lever 37 is rotated to release the screwing engagement between recess 303 formed on the bottom surface of lower pipe lid 30 and fixing unit 234, and lower pipe lid 30 is separated from fixing unit 234 (step S21). Operation lever 37 is further rotated to release the screwing engagement between upper pipe lid 32 and introduction pipe 28, and upper pipe lid 32 is separated from hole 221 (step S22).

Subsequently, heater 31 is drawn out of water pipe 22a by pulling up operation lever 37 (step S23). At this point, heater 31 is drawn out into the internal space of sealed guide member 35, so that the outflow of the water through hole 221 of water pipe 22a and the inflow of the air through hole 221 to water pipe 22a can be prevented. Thereafter, operation lever 37 is rotated to screw lower pipe lid 30 and introduction pipe 28 together (step S24). Hole 221 formed in water pipe 22a is thus closed by lower pipe lid 30. As a result, the outflow of water through hole 221 of water pipe 22a and the inflow of the air through hole 221 to the inside of water pipe 22a can be prevented. FIG. 4 illustrates a state after step S24.

Subsequently, set screw 60 is removed to separate introduction pipe 28 from guide member 35 (step S25). Thereafter, heater 31 is separated (removed) from joint 302 (step S26). When upward force is applied to heater 31, joint 302 releases pinching of heater 31. Finally, disc-shaped plate member 29 is installed on flange 282 of introduction pipe 28, and fixed with set screw 60, thereby closing introduction pipe 28 (step S27). By performing steps S21 to S27, scale removal device 3 transitions from the first state (see FIG. 3) to the second state (see FIG. 5) in which heater 31 is removed from water circulation device 2. Scale removal device 3 in the second state is reused when the water in water circulation circuit 20 is exchanged. Alternatively, scale removal device 3 in the second state may be reused to remove the scale in water circulation circuit 20 included in another water circulation device 2.

(Modification)

In the above description, when heater 31 is installed in water circulation device 2 (steps S11 to S17), lower pipe lid 30 is previously screwed into introduction pipe 28. Alternatively, lower pipe lid 30 may be screwed into fixing unit 234 of water pipe 22a. In this case, step S14 in FIG. 7 is omitted, and step S11 is performed at the same time as step S16 after steps S12, S13, S15. That is, after steps S12, S13, S15 are sequentially performed, operation lever 37 is rotated to screw upper pipe lid 32 into introduction pipe 28 (step S16). At this point, the lower end of heater 31 comes into contact with joint 302 on the upper surface of lower pipe lid 30, and the lower end of heater 31 is attached to lower pipe lid 30 by way of joint 302 (step S11).

(Advantages)

As described above, the method for constructing water circulation device 2 of the first embodiment includes at least steps S1, S2, S6. Step S1 is a process of installing heater 31 in water circulation device 2 in contact with the water. Step S2 is a process of depositing the scale from the water on heater 31 by heating heater 31 while circulating the water in water circulation circuit 20. Step S6 is a process of removing heater 31 from water circulation device 2 after step S2.

With this configuration, during the construction of water circulation device 2, the scale in the water is deposited on heater 31, and heater 31 is removed from water circulation device 2. That is, heater 31 is removed from water circulation device 2 during the use of water circulation device 2. Consequently, when water circulation device 2 is used, the scale does not peel off from heater 31, and does not flow into water circulation circuit 20. As a result, a breakdown of water circulation device 2 due to the scale in water circulation circuit 20 can be prevented.

Water circulation circuit 20 includes heat source-side heat exchanger 21 that performs the heat exchange between the refrigerant and the water. In step S2, heat pump unit 1 is operated such that the refrigerant condenses in heat source-side heat exchanger 21 at a temperature less than 60° C. This enables the temperature of the water in water circulation circuit 20 to be raised in a short time by the heat received from the refrigerant and the heat from heater 31. As a result, the scale deposition on heater 31 can be performed in a short time. Further, the deposition of the scale in heat source-side heat exchanger 21 can be prevented.

Water circulation circuit 20 further includes use-side heat exchanger 231 that performs the heat exchange between the water and the indoor air. In step S1, heater 31 is installed in the portion on the downstream side of heat source-side heat exchanger 21 and on the upstream side of use-side heat exchanger 231 in water circulation circuit 20. This enables the temperature of the water around heater 31 to be easily raised in a short time by the heat received from the refrigerant and the heat from heater 31. As a result, the scale deposition on heater 31 can be performed in a shorter time.

Vertically upward hole 221 that can be opened and closed is formed in water circulation circuit 20. For example, water circulation circuit 20 includes water pipe 22a, and hole 221 is formed in water pipe 22a. In step S1, heater 31 is inserted into water circulation circuit 20 through hole 221. In step S6, heater 31 is drawn out through hole 221. Consequently, steps S1, S6 can easily be performed.

The lower end of heater 31 is attachable to lower pipe lid 30 that can open and close hole 221. Upper pipe lid 32 that can open and close hole 221 is attached at the upper end of heater 31. The lower end of heater 31 is located on the opposite side to the upper end of heater 31. Preferably step S1 includes at least steps S11, S15, S16.

Step S15 is a process of inserting heater 31 from the lower end side into water circulation circuit 20 through hole 221. Step S16 is a process of closing hole 221 using upper pipe lid 32. Step S11 is a process of attaching the lower end of heater 31 to lower pipe lid 30 before or after step S15. Preferably step S6 includes at least steps S22, S23, S24, S26. Step S22 is a process of separating upper pipe lid 32 from hole 221. Step S23 is a process of drawing out heater 31 through hole 221. Step S24 is a process of closing hole 221 using lower pipe lid 30. Step S26 is a process of removing the lower end of heater 31 from lower pipe lid 30.

Consequently, when heater 31 is installed in water circulation circuit 20, upper pipe lid 32 can prevent the water leakage from water circulation circuit 20 and mixture of the air in water circulation circuit 20. When heater 31 is removed from water circulation circuit 20, lower pipe lid 30 can prevent the water leakage from water circulation circuit 20 and the mixture of the air in water circulation circuit 20.

Scale removal device 3 of the first embodiment includes upper pipe lid 32 capable of opening and closing hole 221 and heater 31. Scale removal device 3 is switched between the first state and the second state. The first state is a state in which lower pipe lid 30 and heater 31 are disposed in water circulation circuit 20 while hole 221 is closed by upper pipe lid 32. The second state is a state in which hole 221 is closed by lower pipe lid 30 while heater 31 and upper pipe lid 32 are disposed outside water circulation circuit 20.

This enables the method for constructing water circulation device 2 to be easily performed. As a result, a breakdown of water circulation device 2 due to the scale in water circulation circuit 20 can be prevented.

Scale removal device 3 further includes guide member 35 that covers hole 221 while accommodating heater 31 and upper pipe lid 32 and operation lever 37 that operates heater 31 and upper pipe lid 32 from the outside of guide member 35. Consequently, the construction method can easily be performed by operating operation lever 37.

Second Embodiment

Figure 9:
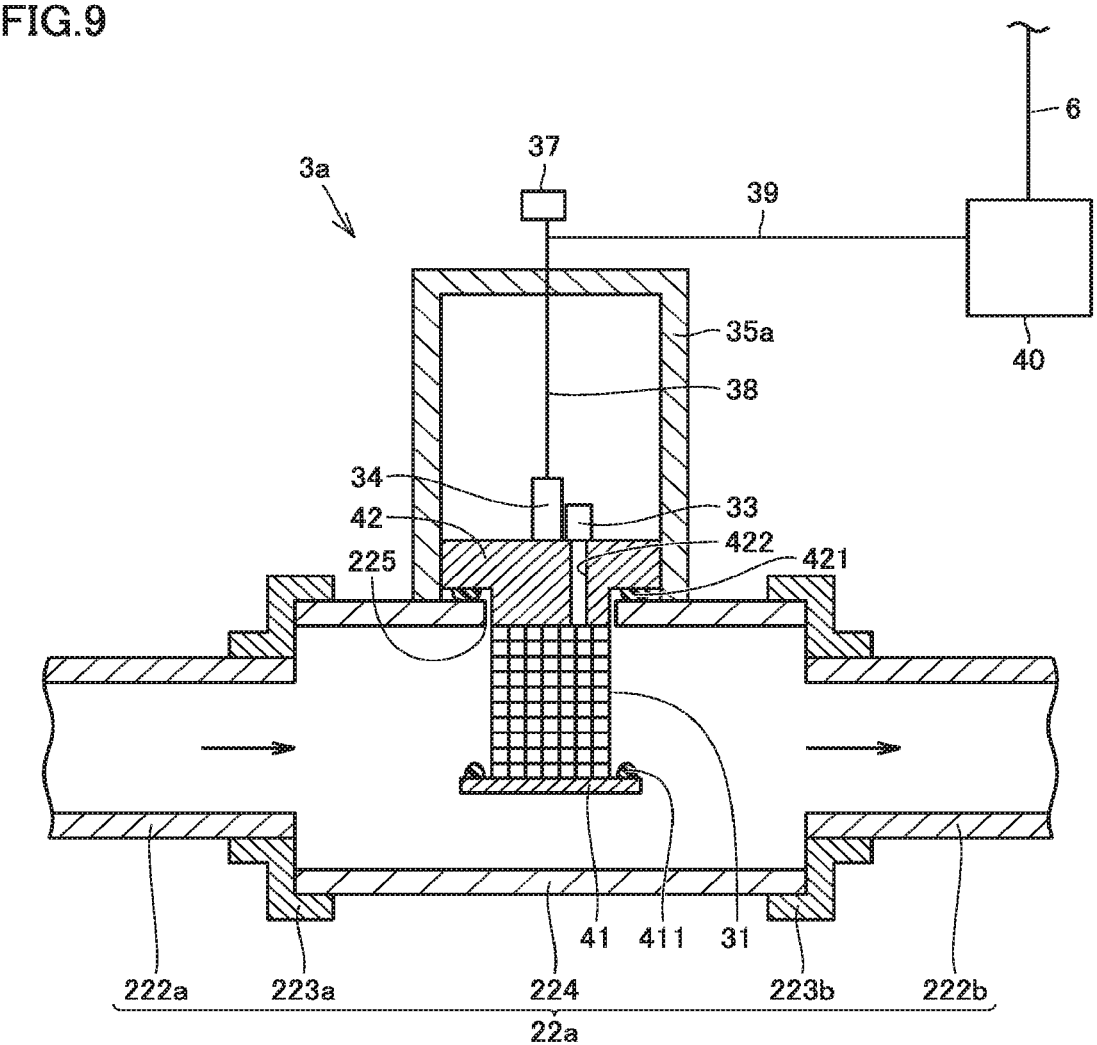
FIG. 9 is a sectional view illustrating a scale removal device according to a second embodiment in the first state.
Figure 10:
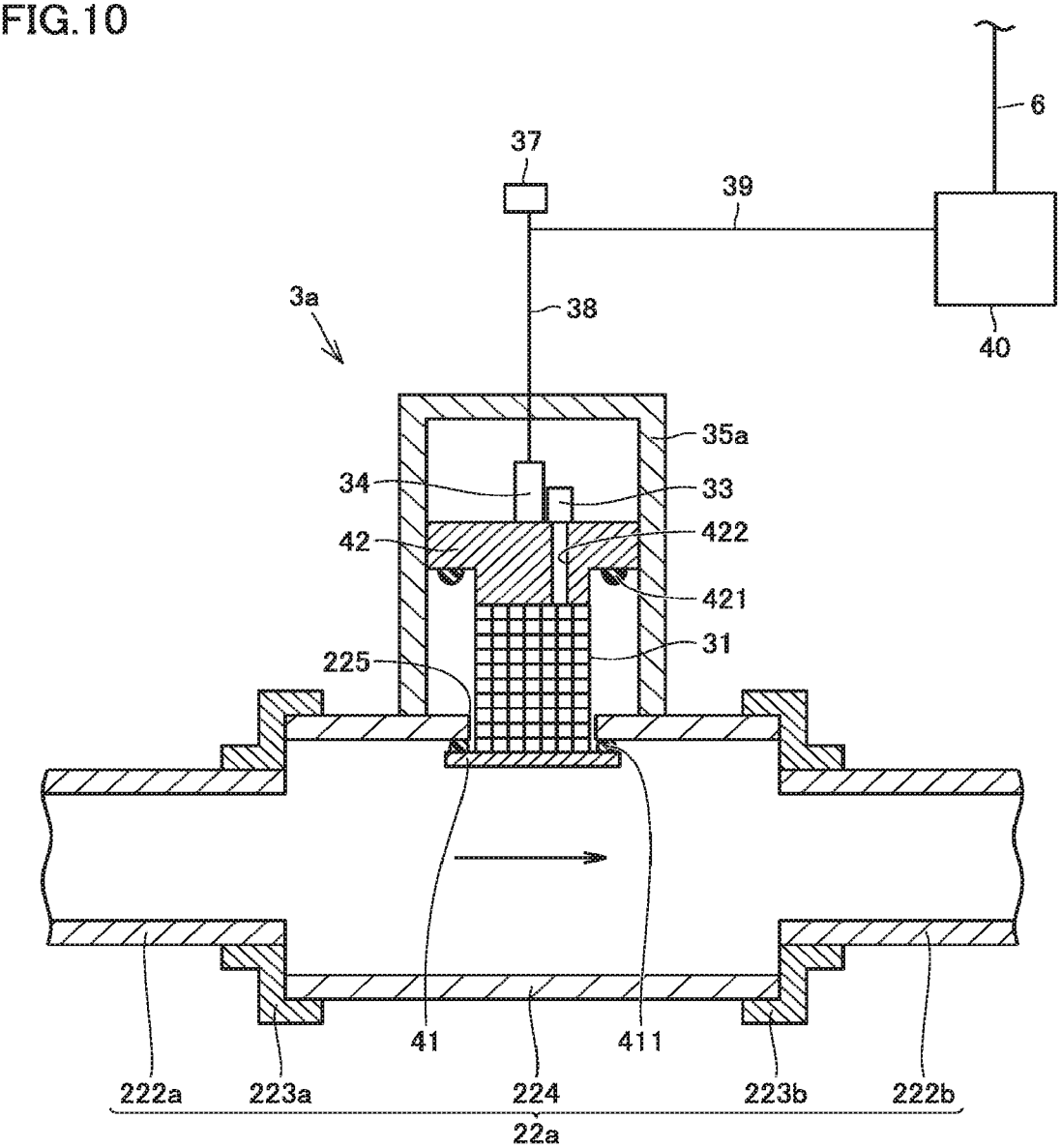
FIG. 10 is a sectional view illustrating the scale removal device of the second embodiment in the second state.

A hot water heating system according to a second embodiment differs from the hot water heating system according to the first embodiment only in that a scale removal device 3a of FIGS. 9 and 10 is included instead of scale removal device 3. FIG. 9 is a sectional view illustrating scale removal device 3a of the second embodiment in the first state. FIG. 10 is a sectional view illustrating scale removal device 3a of the second embodiment in the second state.

As illustrated in FIGS. 9 and 10, water pipe 22a includes circular pipes 222a, 222b having a circular section and a square pipe 224 that has a rectangular section and is provided between circular pipe 222a and circular pipe 222b. Circular pipe 222a and square pipe 224 are connected to each other by a joint pipe 223a, and circular pipe 222b and square pipe 224 are connected to each other by a joint pipe 223b. An area of a hollow portion in the section of square pipe 224 is larger than an area of a hollow portion in each of the sections of circular pipes 222a, 222b. Square pipe 224 is installed such that an upper surface becomes horizontal. A vertically upward hole 225 is formed in the upper surface of square pipe 224. In the second embodiment, water circulation circuit 20 is filled with water having a water pressure higher than an atmospheric pressure.

Scale removal device 3a includes heater 31, a lower pipe lid 41, an upper pipe lid 42, air release valve 33, controller 34, a guide member 35a, operation lever 37, connecting rod 38, and wiring line 39, and power supply 40. Heater 31, air release valve 33, controller 34, operation lever 37, connecting rod 38, wiring line 39, and power supply 40 are as described in the first embodiment.

Lower pipe lid 41 is a flat plate that is located inside square pipe 224 and is larger than hole 225. Lower pipe lid 41 is attached to the lower end of heater 31. A rubber O-ring 411 is attached to the upper surface of lower pipe lid 41. When lower pipe lid 41 is pushed upward by the water pressure in square pipe 224, O-ring 411 comes into close contact with the upper inner wall surface of square pipe 224, and hole 225 is closed.

Upper pipe lid 42 is a flat plate that is located outside square pipe 224 and is larger than hole 225. Upper pipe lid 42 is attached to the upper end of heater 31. In upper pipe lid 42, an air vent 422 is formed along the axial direction. Air release valve 33 is provided on the upper surface of upper pipe lid 42 so as to cover air vent 422. Controller 34 and connecting rod 38 are attached to upper pipe lid 42. For this reason, when operation lever 37 is pressed down, heater 31 attached to the lower side of upper pipe lid 42 and lower pipe lid 41 are inserted into square pipe 224. A rubber O-ring 421 is attached to the lower surface of upper pipe lid 42. For this reason, when operation lever 37 is further pressed down, O-ring 421 comes into close contact with the upper surface of square pipe 224, and hole 225 is closed by upper pipe lid 42.

Because lower pipe lid 41 and upper pipe lid 42 are larger than hole 225, while heater 31 is passed through hole 225, upper pipe lid 42 is attached to the upper end of heater 31, and lower pipe lid 41 is attached to the lower end of heater 31.

Guide member 35a is connected to square pipe 224 so as to cover hole 225. Guide member 35a has a cylindrical shape in which the upper end is closed, and accommodates heater 31, upper pipe lid 42, air release valve 33, and controller 34 in the internal space thereof.

The method for constructing the water circulation device of the second embodiment is performed according to the flowcharts in FIGS. 6 to 8. However, steps S11 to S13, S17 are omitted in FIG. 7 illustrating step S1. Further, in step S14, the close contact between O-ring 411 of lower pipe lid 41 and square pipe 224 is released by pressing down operation lever 37. As a result, lower pipe lid 41 separates from hole 225. In step S15, lower pipe lid 41 and heater 31 are inserted into water circulation circuit 20. In step S16, O-ring 421 of upper pipe lid 42 is brought into close contact with the upper surface of square pipe 224 by pressing down operation lever 37.

Further, steps S21, S25 to S27 are omitted in FIG. 8 illustrating step S6. In step S22, the close contact between O-ring 421 of upper pipe lid 42 and square pipe 224 is released by pulling up operation lever 37. As a result, upper pipe lid 42 separates from hole 225. In step S23, heater 31 is drawn out of square pipe 224 by further pulling up operation lever 37. In step S24, because the water pressure in square pipe 224 is higher than the atmospheric pressure, O-ring 411 of lower pipe lid 41 is pressed against the inner wall surface of square pipe 224. Consequently, hole 225 is closed, and water leakage to the outside of square pipe 224 and the inflow of the air into square pipe 224 can be prevented.

As described above, in scale removal device 3a of the second embodiment, lower pipe lid 41 capable of opening and closing hole 225 is attached to the lower end of heater 31, and upper pipe lid 42 capable of opening and closing hole 225 is attached to the upper end of heater 31. Step S1 includes a process of inserting lower pipe lid 41 and heater 31 into water circulation circuit 20 and a process of closing hole 225 using upper pipe lid 42. Step S6 includes a process of separating upper pipe lid 42 from hole 225, a process of pulling out heater 31 through hole 225, and a process of closing hole 225 using lower pipe lid 41. Consequently, when heater 31 is installed in water circulation circuit 20, upper pipe lid 42 can prevent the water leakage from water circulation circuit 20 and mixture of the air in water circulation circuit 20. When heater 31 is removed from water circulation circuit 20, lower pipe lid 41 can prevent the water leakage from water circulation circuit 20 and the mixture of the air in water circulation circuit 20.

Scale removal device 3a includes guide member 35a that covers hole 225 while accommodating heater 31 and upper pipe lid 42 and operation lever 37 that operates lower pipe lid 41, heater 31, and upper pipe lid 42 from the outside of guide member 35a. Consequently, the method for constructing water circulation device 2 in steps S1 to S6 can easily be performed by operating operation lever 37.

In scale removal device 3a, O-ring 421 is provided on upper pipe lid 42, and upper pipe lid 42 closes hole 225 by the close contact between O-ring 421 and square pipe 224. Similarly, O-ring 411 is provided on lower pipe lid 41, and lower pipe lid 41 closes hole 225 by the close contact between O-ring 411 and square pipe 224. In this way, in scale removal device 3a, it is not necessary to rotate operation lever 37, and heater 31 can be moved in and out of square pipe 224 by the simple operation.

Further, scale removal device 3a can be made with the simple structure.

Third Embodiment

Figure 11:
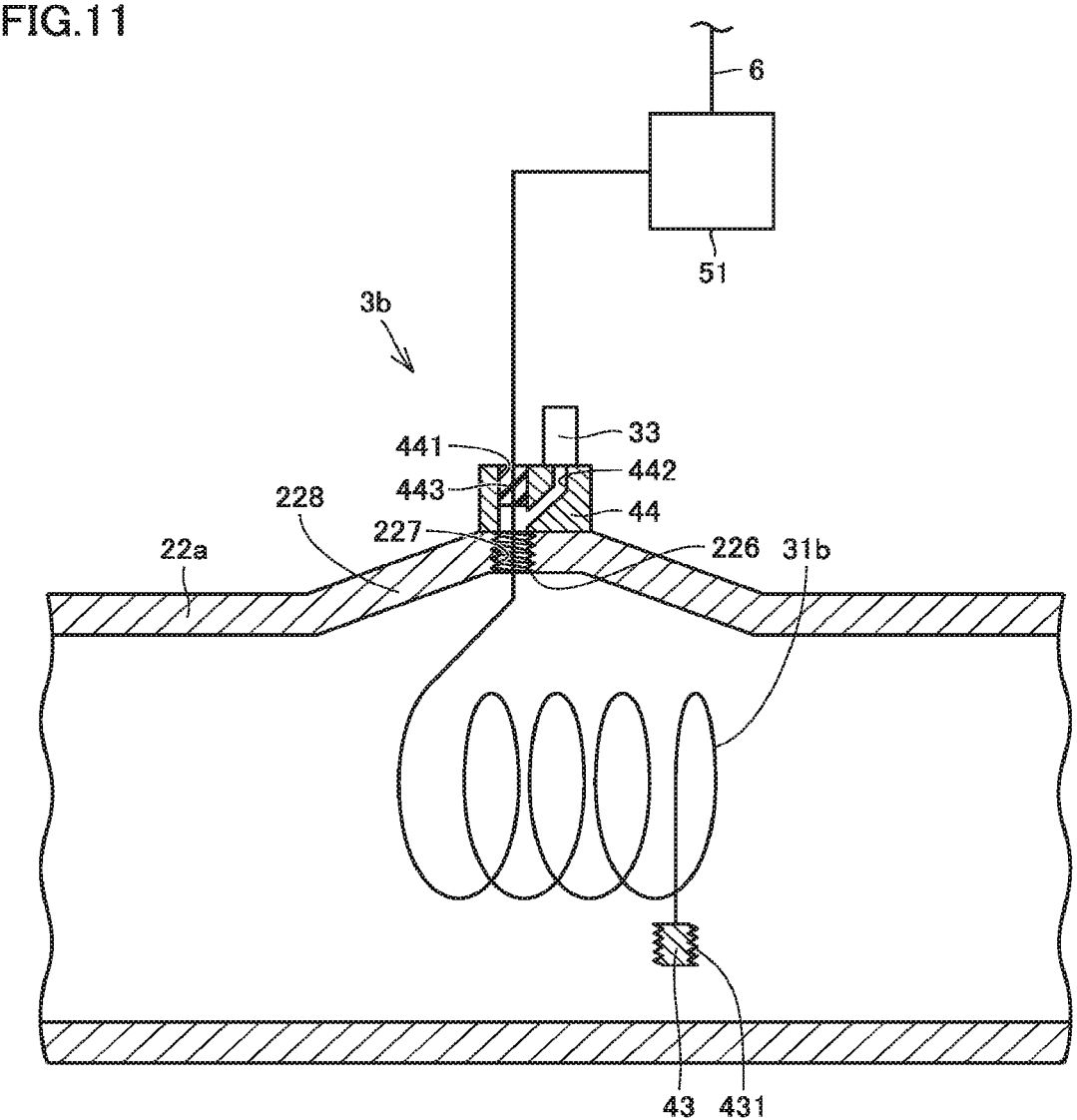
FIG. 11 is a sectional view illustrating a scale removal device according to a third embodiment in the first state.
Figure 12:
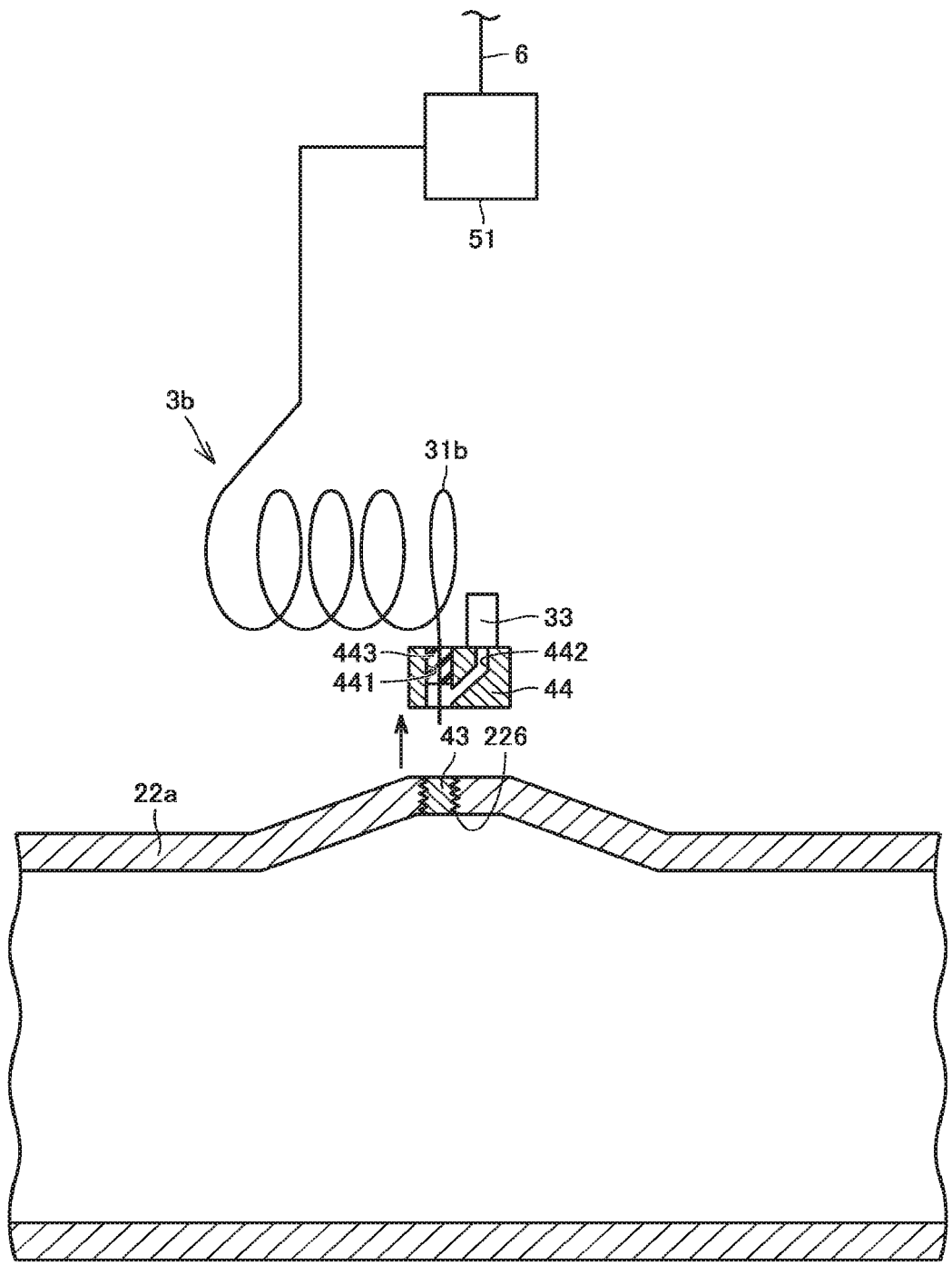
FIG. 12 is a sectional view illustrating the scale removal device of the third embodiment in the second state.

A hot water heating system according to a third embodiment differs from the hot water heating system according to the first embodiment only in that a scale removal device 3b in FIGS. 11 and 12 is included instead of scale removal device 3. FIG. 11 is a sectional view illustrating scale removal device 3b of the third embodiment in the first state. FIG. 12 is a sectional view illustrating scale removal device 3b of the third embodiment in the second state.

As illustrated in FIGS. 11 and 12, water pipe 22a includes an air bubble trap 228 in which a part of the wall is curved and protrudes outward. Water pipe 22a is installed such that air bubble trap 228 is located on the upper side. A vertically upward hole 226 is formed in the center of air bubble trap 228. A female screw 227 is formed on the inner circumferential surface of hole 226.

Scale removal device 3b includes a heater 31b, a lower pipe lid 43, an upper pipe lid 44, air release valve 33, and a power controller 51.

Heater 31b has a linear shape (string shape), and is prepared by twisting two nichrome wires that generate heat during energization and a support wire made of a shape memory alloy. A protective overcoat made of an insulator covers each of the two nichrome wires. Ends of the two nichrome wires are short-circuited. Electricity is provided from the other end of one of the nichrome wires to the other end of the other nichrome wire, whereby the nichrome wires generate the heat. The support wire of heater 31b has a property of recovering to a coil shape when the temperature exceeds a specified temperature (for example, 40° C.).

Lower pipe lid 43 is a lid that can open and close hole 226. Lower pipe lid 43 has a columnar shape. A male screw 431 that can be screwed in female screw 227 of hole 226 is formed on the outer circumferential surface of lower pipe lid 43.

The end of heater 31b is attachable to lower pipe lid 43. An insertion port (not illustrated) into which the end of heater 31b is inserted is formed in lower pipe lid 43. The end of heater 3 lb is sandwiched when inserted into the insertion port. When tensile force exceeding specified force is applied to heater 31b, the end of heater 31b releases from lower pipe lid 43.

Upper pipe lid 44 is a lid that can open and close hole 226. Upper pipe lid 44 is attached to water pipe 22a so as to cover hole 226, thereby closing hole 226. Upper pipe lid 44 is removed from water pipe 22a, thereby opening hole 226. An insertion opening 441 through which linear heater 31b can be passed and an air vent 442 through which the air bubbles can be passed are formed in upper pipe lid 44. A gasket 443 is provided in insertion opening 441, and a gap between heater 31b and insertion opening 441 is closed when heater 3 lb is inserted into insertion opening 441. Air release valve 33 is provided on the upper surface of upper pipe lid 44 so as to cover air vent 442.

Power controller 51 receives an instruction from control device 4, supplies current to the nichrome wires constituting heater 31b, and heats heater 31b.

The method for constructing the water circulation device of the third embodiment is performed according to the flowchart in FIG. 6 similarly to the first embodiment. However, details of steps S1 and S6 in the third embodiment differ from those in the first embodiment. The details of steps S1 and S6 in the third embodiment will be described below.

Figure 13:
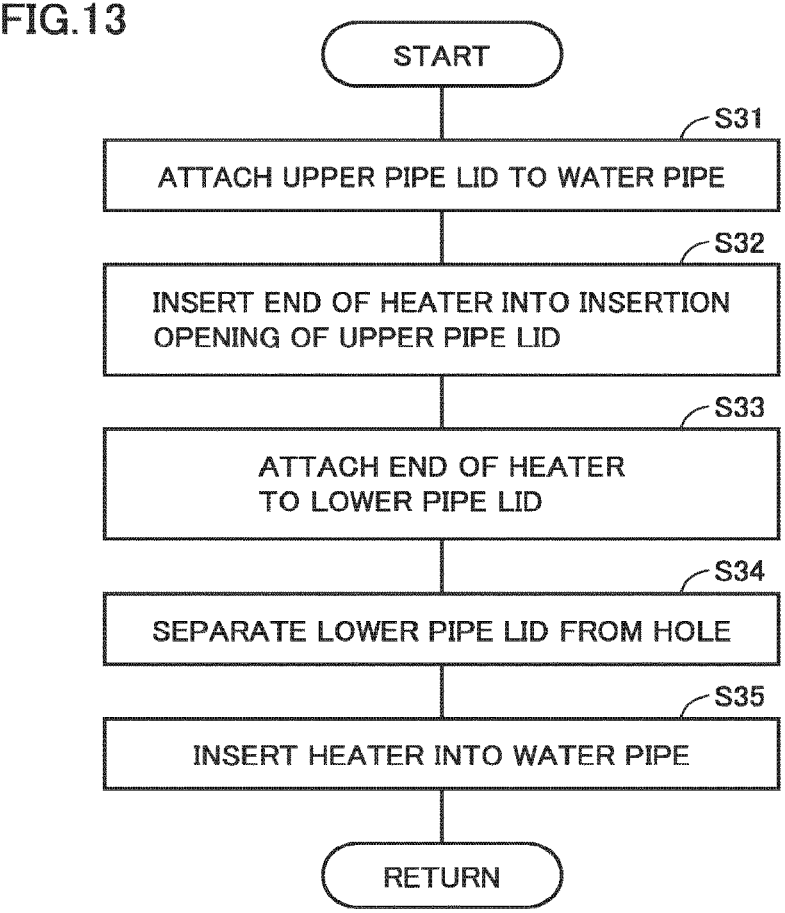
FIG. 13 is a flowchart illustrating a subroutine of step S1 in the third embodiment.

(Process of installing heater in water circulation device) FIG. 13 is a flowchart illustrating a subroutine of step S1 in the third embodiment. Upper pipe lid 44 is attached to water pipe 22a so as to cover hole 226 of water pipe 22a (step S31). At this point, lower pipe lid 43 is screwed into hole 226. Subsequently, the end of heater 31b is inserted into hole 226 through insertion opening 441 of upper pipe lid 44 (step S32), and the end of heater 3 lb is attached to lower pipe lid 43 (step S33). Subsequently, the screwing engagement between lower pipe lid 43 and hole 226 is released by rotating heater 31b, and lower pipe lid 43 is separated from hole 226 (step S34). Further, heater 31b is inserted into water pipe 22a with lower pipe lid 43 attached to the end (step S35). At this point, gasket 443 is provided in insertion opening 441, so that the water leakage through insertion opening 441 and the inflow of the air into water pipe 22a can be prevented. Heater 31b can be installed in water pipe 22a through steps S31 to S35.

Heater 31b inserted into water pipe 22a changes into various shapes according to the force during the insertion. However, heater 31b includes the support wire made of the shape memory alloy. For this reason, in step S2, heater 31b recovers to the coil shape as illustrated in FIG. 11 when the water temperature around heater 31b exceeds the specified temperature.

Step S31 can be omitted when upper pipe lid 44 is already attached to water pipe 22a in preparing water pipe 22a. In the above description, lower pipe lid 43 is screwed in water pipe 22a in steps S32, S33. Alternatively, when upper pipe lid 44 is already attached to water pipe 22a in preparing water pipe 22a, lower pipe lid 43 may be disposed in water pipe 22a and not be screwed in water pipe 22a. In this case, step S34 can be omitted.

(Process of Removing Heater From Water Circulation Device)

Figure 14:
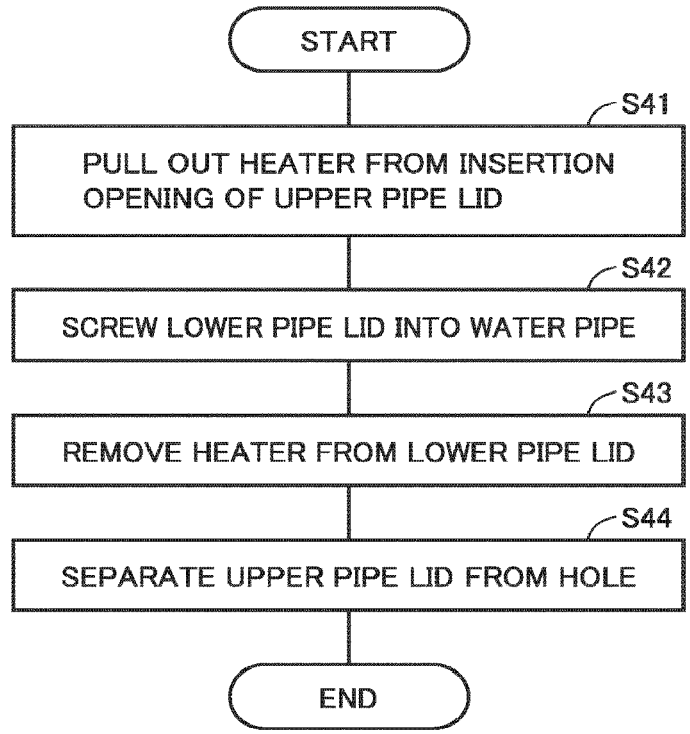
FIG. 14 is a flowchart illustrating a subroutine of step S6 in the third embodiment.

FIG. 14 is a flowchart illustrating a subroutine of step S6 in the third embodiment. When the elapsed time from the start of heating of heater 31b exceeds the specified time to complete the deposition of the scale and the removal of the air bubbles, heater 31b is pulled out through insertion opening 441 of upper pipe lid 44 (step S41). When lower pipe lid 43 reaches hole 226, heater 31b is rotated to screw lower pipe lid 43 into hole 226 of water pipe 22a (step S42). This can prevent the water leakage through hole 226 of water pipe 22a and the inflow of the air through hole 226 into water pipe 22a.

Subsequently, heater 31b is removed from lower pipe lid 43 by applying tensile force to heater 31b (step S43). Finally, upper pipe lid 44 is removed from water pipe 22a, and separated from hole 226 (step S44).

As described above, when scale removal device 3b of the third embodiment is used, step S1 includes at least steps S32, S33, S35. Step S32 is a process of inserting the end of linear heater 31b into insertion opening 441 of upper pipe lid 44 with hole 226 closed by lower pipe lid 43. Step S33 is a process of attaching lower pipe lid 43 to the end of heater 31b. Step S35 is a process of inserting heater 31b through insertion opening 441 into water circulation circuit 20. Step S6 includes steps S41, S42, S43, S44. Step S41 is a process of pulling out heater 31b through insertion opening 441 until the end of heater 31b reaches hole 226. Step S42 is a process of closing hole 226 using lower pipe lid 43. Step S43 is a process of removing the end of heater 31b from lower pipe lid 43. Step S44 is a process of separating upper pipe lid 44 from hole 226. Thus, a diameter of hole 226 formed in water pipe 22a can be reduced. Further, heater 31b can easily be removed from the water circulation device after the scale deposition.

Fourth Embodiment

The heater of the scale removal device of the first to third embodiments is installed in water pipe 22a constituting water circulation circuit 20. On the other hand, a heater 31c of a scale removal device 3c according to a fourth embodiment is installed in tank 26 constituting water circulation circuit 20.

Figure 15:
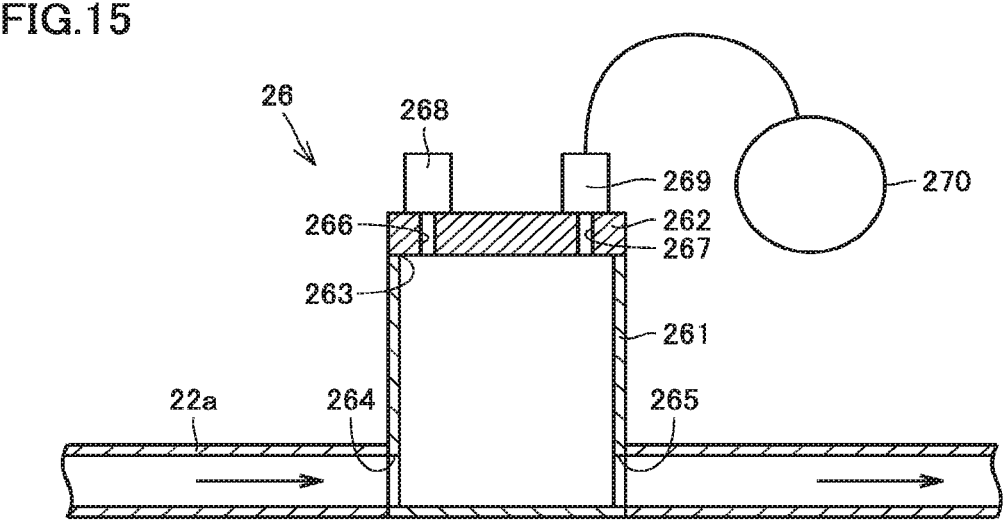
FIG. 15 is a view illustrating a schematic configuration of a tank.

FIG. 15 is a view illustrating a schematic configuration of tank 26. As illustrated in FIG. 15, tank 26 includes a tank body 261, a lid 262, an air release valve 268, a connecting pipe 269, and a sub-container 270.

A suction port 264 and a discharge port 265 that are connected to water pipe 22a are formed in a lower portion of tank body 261. The water sucked from suction port 264 is temporarily stored in tank body 261, and discharged from discharge port 154. An opening 263 is formed at the upper end of tank body 261.

Lid 262 closes opening 263 of tank body 261 to seal the internal space of tank body 261. An air vent 266 and a through-hole 267 are formed in lid 262. An air release valve 268 is provided on the upper surface of lid 262 so as to cover air vent 266.

The air bubbles accumulated in the upper portion of tank body 261 can be removed by putting air release valve 268 in the open state. Sub-container 270 is connected to through-hole 267 through connecting pipe 269. Sub-container 270 is made of a stretchable material (for example, rubber), and can change a volume of the internal space. Alternatively, the sub-container may have a stretchable structure (for example, a bellows structure) to change the volume of the internal space. Tank body 261, connecting pipe 269, and sub-container 270 are filled with water. When a volume change is generated in association with a temperature change of the water circulating in water circulation circuit 20, the volume change of the water is absorbed by the expansion and contraction of sub-container 270.

Figure 16:
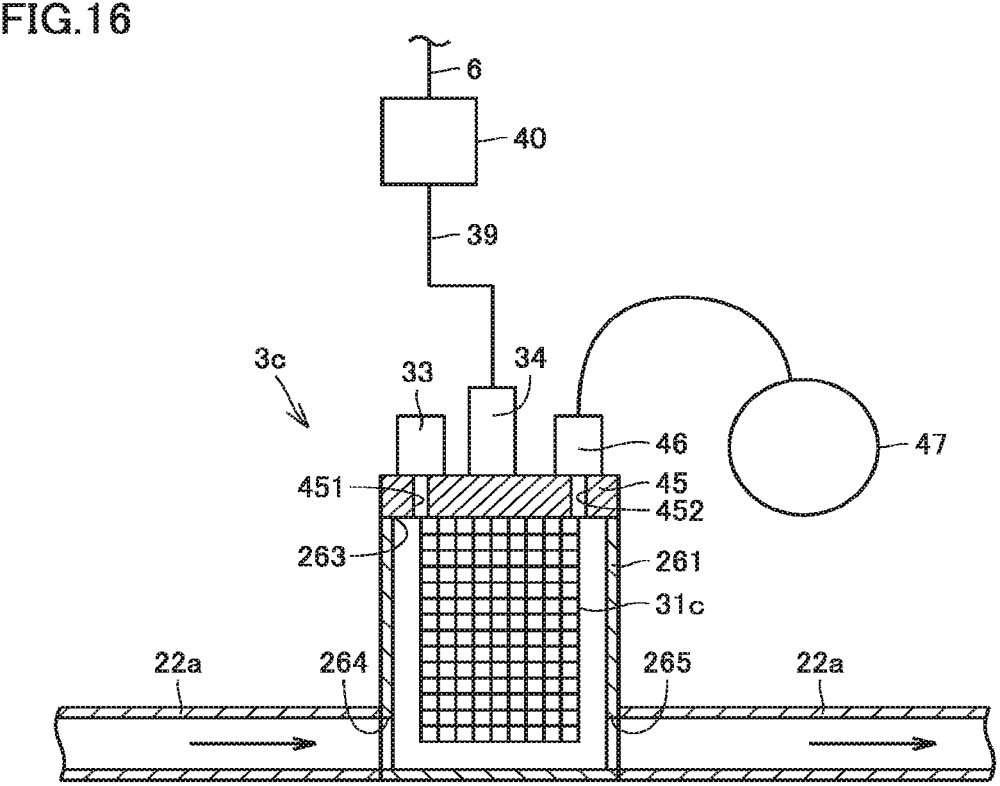
FIG. 16 is a view illustrating a schematic configuration of the scale removal device installed in the tank.

FIG. 16 is a view illustrating a schematic configuration of scale removal device 3c installed in tank 26. As illustrated in FIG. 16, scale removal device 3c includes heater 31c, a lid 45, air release valve 33, controller 34, wiring line 39, power supply 40, a connecting pipe 46, and a sub-container 47. An air vent 451 and a through-hole 452 are formed in lid 45 similarly to lid 262 in FIG. 15. Because air release valve 33, connecting pipe 46, and sub-container 47 have the same configurations as air release valve 268, connecting pipe 269, and sub-container 270 in FIG. 15, the detailed description will be omitted. Controller 34, wiring line 39, and power supply 40 are already described in the first embodiment.

Heater 31c has a size that can be inserted into the internal space of tank body 261, and has a flat net shape. Because the internal space of tank body 261 is wider than the internal space of water pipe 22a, the size of heater 31c is larger than the size of heater 31 of the first embodiment. Heater 31c is attached to the lower surface of lid 45. Heater 31c is connected to controller 34, and is heated by the energization using controller 34.

The method for constructing the water circulation device of the fourth embodiment is performed according to the flowchart in FIG. 6 similarly to the first embodiment. However, in step S1 in the fourth embodiment, lid 262, air release valve 268, connecting pipe 269, and sub-container 270 in FIG. 15 are removed from tank body 261, and scale removal device 3c in FIG. 16 is attached. This enables heater 31c to be installed in tank 26 constituting water circulation circuit 20.

In step S3, the air bubbles accumulated in the upper portion of tank body 261 can be removed by putting air release valve 33 in the open state.

In step S6, scale removal device 3c in FIG. 16 is removed from tank body 261, and lid 262, air release valve 268, connecting pipe 269, and sub-container 270 in FIG. 15 are attached to tank body 261 instead. This enables heater 31c to be removed from the inside of tank 26 constituting water circulation circuit 20.

Fifth Embodiment

The heater of the scale removal device of the first to fourth embodiments are provided in water pipe 22a or tank 26 constituting water circulation circuit 20. On the other hand, a heater 31d of a scale removal device 3d according to a fifth embodiment is installed in a bypass path branching from water circulation circuit 20.

Figure 17:
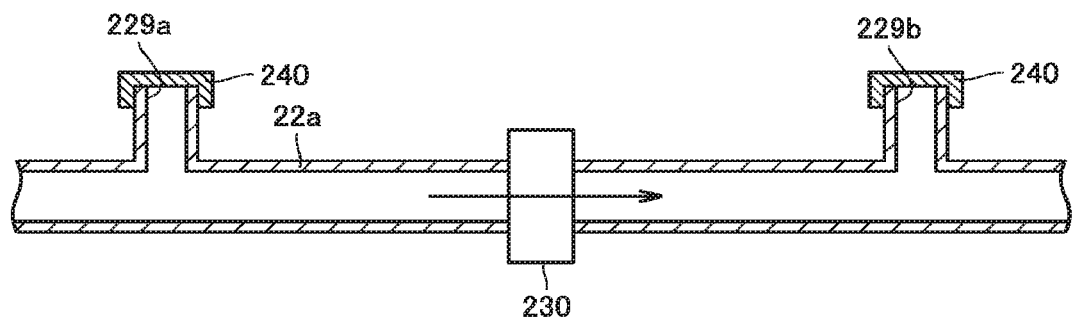
FIG. 17 is a view illustrating a schematic configuration of a water pipe according to a fifth embodiment.

FIG. 17 is a view illustrating a schematic configuration of water pipe 22a of the fifth embodiment. As illustrated in FIG. 17, a vertically upward first branch hole 229a and a vertically upward second branch hole 229b are formed in water pipe 22a. Second branch hole 229b is disposed on a downstream side of first branch hole 229a. Lids 240 that close first branch hole 229a and second branch hole 229b are provided on water pipe 22a. In water pipe 22a, a flow channel switching valve 230 is provided between first branch hole 229a and second branch hole 229b.

Figure 18:
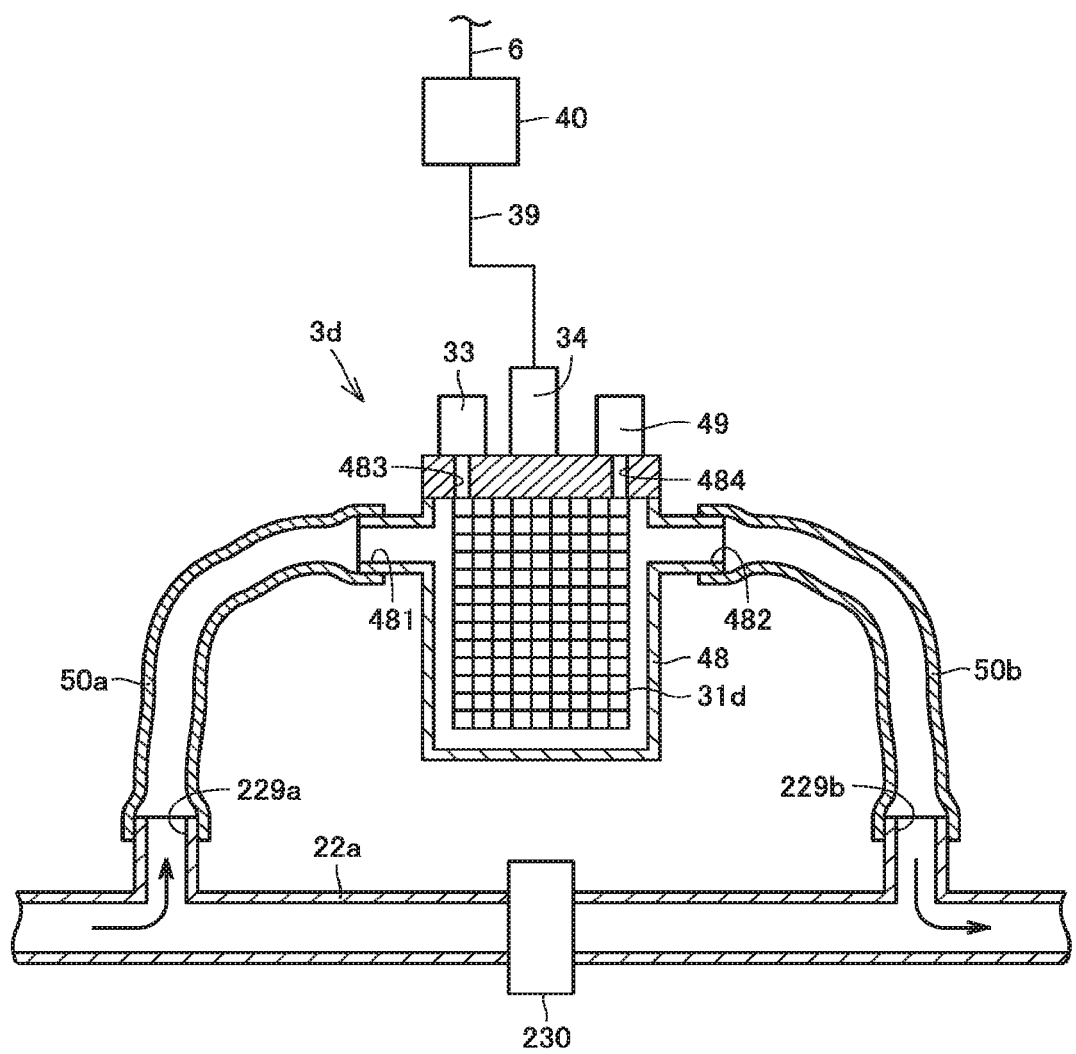
FIG. 18 is a view illustrating a schematic configuration of a scale removal device of the fifth embodiment.

FIG. 18 is a view illustrating a schematic configuration of scale removal device 3d of the fifth embodiment. As illustrated in FIG. 18, scale removal device 3d includes a container 48, heater 31d, air release valve 33, controller 34, wiring line 39, power supply 40, and a feed-water valve 49. Air release valve 33, controller 34, wiring line 39, and power supply 40 are already described in the first embodiment.

Container 48 temporarily stores the water in the internal space. A suction port 481, a discharge port 482, an air vent 483, and a feed-water inlet 484 are formed in container 48. Suction port 481 and discharge port 482 are formed opposite to each other in the sidewall of container 48. Air vent 483 and feed-water inlet 484 are formed on the upper wall of the container.

Feed-water valve 49 is provided on the upper surface of container 48 so as to cover feed-water inlet 484. The water is supplied through feed-water inlet 484 into container 48 by opening feed-water valve 49.

Heater 31d has a flat net shape, and is heated by the energization using controller 34. Heater 31d is accommodated in container 48. The sidewall and the upper wall of container 48 can be separated from each other, and heater 31d can be taken out of container 48 for the purpose of maintenance.

Figure 19:
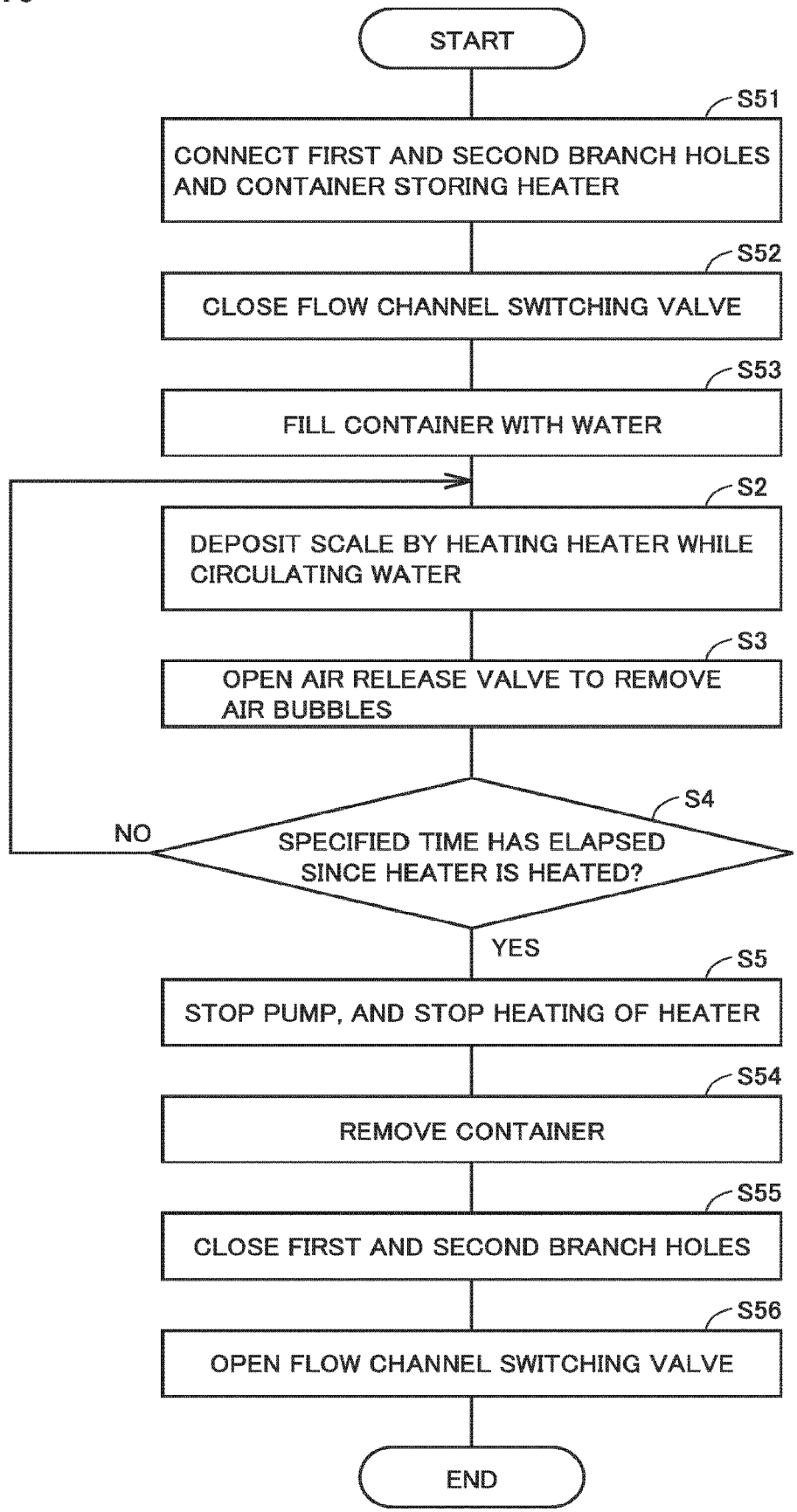
FIG. 19 is a flowchart illustrating a whole of a method for constructing a water circulation device of the fifth embodiment.

With reference to FIG. 19, a water circulation device construction method will be described below. FIG. 19 is a flowchart illustrating a whole of the method for constructing the water circulation device of the fifth embodiment. Container 48 is connected to water pipe 22a such that first branch hole 229a and second branch hole 229b communicate with each other through the inside of container 48 (step S51). This enables the generation of a bypass path returning to water circulation circuit 20 through first branch hole 229a, container 48, and second branch hole 229b in order.

Specifically, first branch hole 229a formed in water pipe 22a is connected to suction port 481 of container 48 by a pipe 50a, and second branch hole 229b formed in water pipe 22a is connected to discharge port 482 of container 48 by a pipe 50b (see FIG. 18). Preferably tubes 50a, 50b are a flexible tube. Consequently, the connection between water pipe 22a and container 48 can easily be performed.

Subsequently, flow channel switching valve 230 is closed (step S52). Steps S51 and S52 constitute a process of installing heater 31d of scale removal device 3d in water circulation device 2 so as to contact with the circulating water.

Subsequently, container 48 is filled with water while feed-water valve 49 and air release valve 33 are opened so that the air in container 48 is allowed to escape (step S53). Water circulation circuit 20 may be filled with the water before step S53, or water circulation circuit 20 may be filled with the water together with container 48 in step S53.

Subsequently, steps S2 to S5 are performed similar to those in the first embodiment. Thereafter, pipes 50a, 50b are removed, container 48 is removed from water pipe 22a (step S54), and first branch hole 229a and second branch hole 229b are closed by lid 240 (step S55) (see FIG. 17). Finally, flow channel switching valve 230 is opened (step S56). Steps S54 to S56 constitute a process of removing heater 31d from water circulation device 2.

In step S3, similarly to step S53, feed-water valve 49 may be opened, and container 48 may be filled with the water while the air bubbles in container 48 are evacuated. This enables the air bubbles in container 48 to be easily removed. Step S53 may be omitted when container 48 filled with the water is connected to water pipe 22a in step S51.

As described above, in the method for constructing the water circulation device of the fifth embodiment, the process of installing heater 31d in water circulation device 2 includes steps S51 and S52. Step S51 is a process of connecting container 48 to water pipe 22a such that first branch hole 229a and second branch hole 229b communicate with each other through the inside of container 48, and of generating the bypass path returning to water circulation circuit 20 through first branch hole 229a, container 48, and second branch hole 229b in order. Step S52 is a process of closing flow channel switching valve 230. The process of removing heater 31d from water circulation device 2 includes steps S54 to S56. Step S54 is a process of removing container 48 from water pipe 22a. Step S55 is a process of closing first branch hole 229a and second branch hole 229b. Step S56 is a process of opening flow channel switching valve 230. Consequently, the scale can be removed in container 48 on the bypass path. The bypass path is removed after the scale is removed, so that the scale can be prevented from flowing into water circulation circuit 20 during the use of the water circulation device.

Sixth Embodiment

A water circulation device construction method according to a sixth embodiment is a modification of the water circulation device construction method according to the fifth embodiment. Heater 31d of scale removal device 3d is installed in the bypass path in the fifth embodiment. On the other hand, in the sixth embodiment, heater 31d of scale removal device 3d is installed in water circulation circuit 20.

Figure 20:
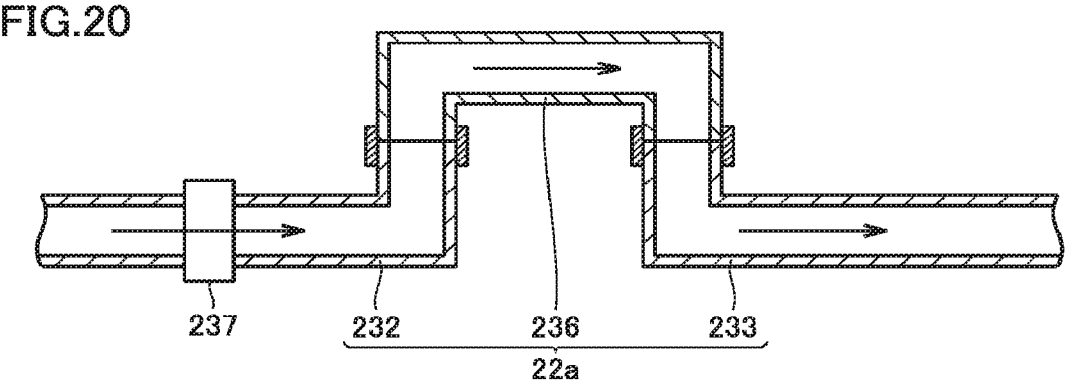
FIG. 20 is a view illustrating a schematic configuration of a water pipe according to a sixth embodiment.

FIG. 20 is a view illustrating a schematic configuration of water pipe 22a of the sixth embodiment. As illustrated in FIG. 20, water pipe 22a includes a first pipe 232, a second pipe 233, and a joint 236 connecting first pipe 232 and second pipe 233. Second pipe 233 is disposed on the downstream side of first pipe 232. A water stop valve 237 is provided in first pipe 232.

Figure 21:
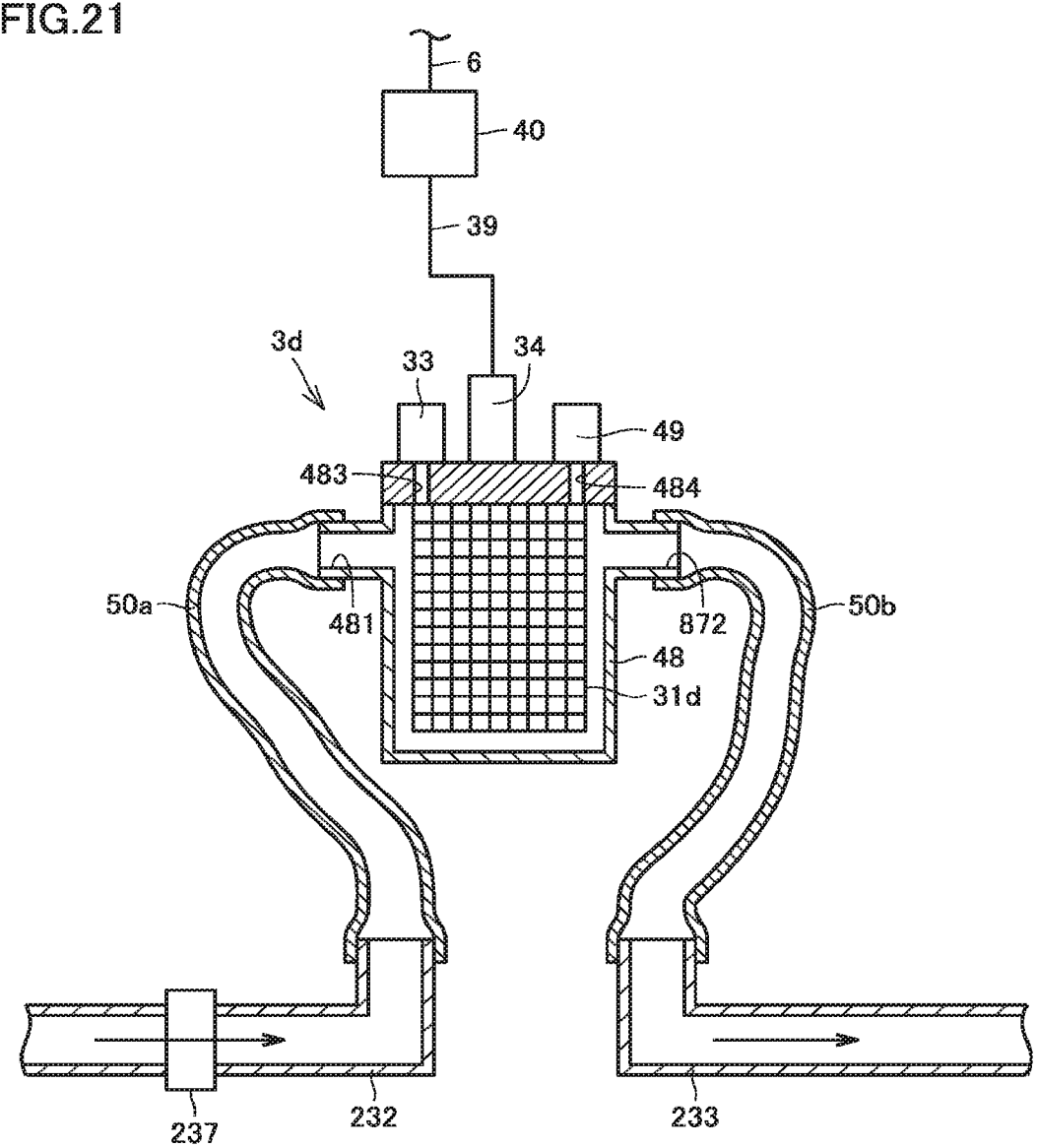
FIG. 21 is a view illustrating an example of installation of a scale removal device in a water circulation device of the sixth embodiment.
Figure 22:
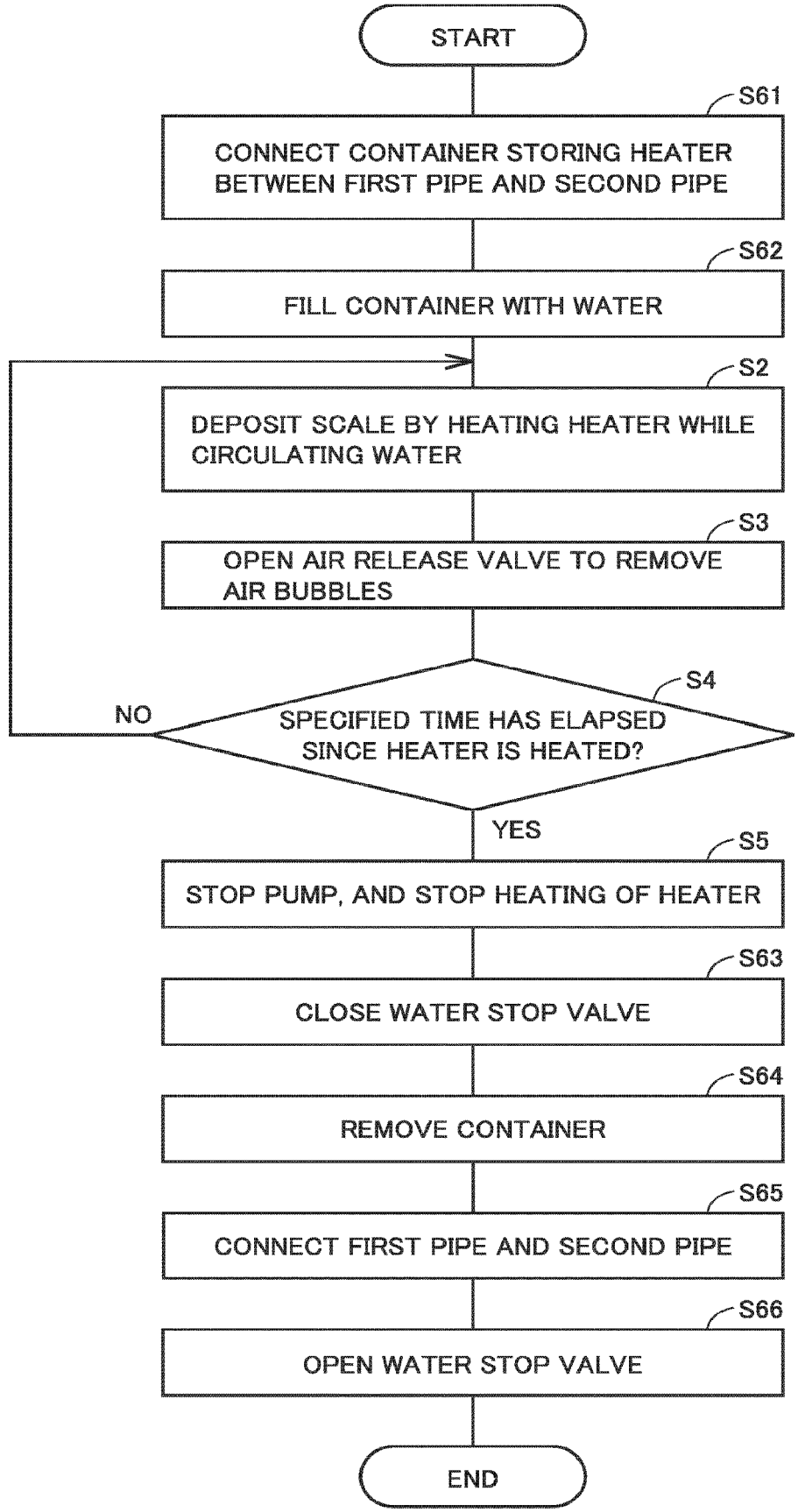
FIG. 22 is a flowchart illustrating a method for constructing the water circulation device of the sixth embodiment.

With reference to FIGS. 21 and 22, the water circulation device construction method of the sixth embodiment will be described. FIG. 21 is a view illustrating an example of installation of scale removal device 3d in the water circulation device of the sixth embodiment. FIG. 22 is a flowchart illustrating a method for constructing the water circulation device of the sixth embodiment.

Container 48 is connected between first pipe 232 and second pipe 233 such that the water flows sequentially in first pipe 232, container 48, and second pipe 233 (step S61). Specifically, as illustrated in FIG. 21, the end of first pipe 232 and suction port 481 of container 48 are connected to each other by pipe 50a, and the end of second pipe 233 and discharge port 482 of container 48 are connected to each other by pipe 50b. Water stop valve 237 is put in the open state. Preferably tubes 50a, 50b are a flexible tube. Consequently, the connection between first pipe 232 and second pipe 233 and container 48 can easily be performed. Step S61 constitutes a process of installing heater 31 of scale removal device 3d in the water circulation device so as to contact with the circulating water.

Subsequently, container 48 is filled with water while feed-water valve 49 and air release valve 33 are opened so that the air in container 48 is allowed to escape (step S62). Circulation circuit 20 may be filled with the water before step S62, or water circulation circuit 20 may be filled with the water together with container 48 in step S62.

Subsequently, steps S2 to S5 are performed similar to those in the first embodiment. After water stop valve 237 is closed (step S63), container 48 is removed from first pipe 232 and second pipe 233 (step S64). Thereafter, first pipe 232 and second pipe 233 are connected to each other by joint 236 (step S65), and water stop valve 237 is opened (step S66). Steps S64, S65 constitute a process of removing heater 31d from the water circulation device.

As described above, in the water circulation device construction method of the sixth embodiment, the process of installing heater 31d in water circulation device 2 includes step S61. Step S61 is a process of connecting container 48 between first pipe 232 and second pipe 233 such that the water flows sequentially in first pipe 232, container 48, and second pipe 233. The process of removing heater 31d from the water circulation device includes steps S64, S65. Step S64 is a process of removing container 48 from first pipe 232 and second pipe 233. Step S65 is a process of connecting first pipe 232 and second pipe 233 using joint 236. This enables the scale to be removed from container 48 between first pipe 232 and second pipe 233. Container 48 is removed after the removal of the scale, so that the scale can be prevented from flowing out to water circulation circuit 20 during the use of water circulation device 2.

Modifications

The method for constructing water circulation device 2 of each of the above embodiments may include a process of measuring an amount of calcium contained in the water in water circulation circuit 20. Consequently, the scale deposition process using the scale removal device can be performed while the amount of calcium in the water is checked. In this case, instead of step S4 in FIGS. 6, 19, and 22, preferably it is determined whether the measured calcium amount is less than a specified value, and steps S5 and subsequent steps are performed when the calcium amount becomes less than the specified value. As a result, the amount of calcium in the water can be less than the specified value.

In the first embodiment, the feed-water inlet different from air vent 321 may be formed in upper pipe lid 32, and the feed-water valve covering the different feed-water inlet may be provided on the upper surface of upper pipe lid 32. In step S3, the feed-water valve may be opened together with air release valve 33 to supply the water into water pipe 22a. This enables the air bubbles in water pipe 22a to be easily removed. This modification can also be applied to the second and third embodiments.

In each of the above embodiments, when the air is mixed in water pipe 22a in step S1 of installing the heater in water pipe 22a, step S3 may be performed before step S2.

The heater of the scale removal device according to the first to third embodiments may be installed in tank 26 instead of water pipe 22a.

It should be considered that the disclosed embodiments are an example in all respects and not restrictive. The scope of the present invention is defined by not the description of the embodiments, but the claims, and it is intended that all changes within the meaning and scope of the claims are included in the present invention.

REFERENCE SIGNS LIST

1: heat pump unit, 2: water circulation device, 3, 3a to 3d: scale removal device, 4: control device, 5a, 5b: refrigerant pipe, 6: communication line, 11: pressure reducing valve, 12: evaporator, 13: fan, 14: compressor, 20: water circulation circuit, 21: heat source-side heat exchanger, 21a: refrigerant flow channel, 21b: water flow channel, 22a, 22b: water pipe, 23a, 23b: indoor unit, 24: radiator, 25: pump, 26: tank, 28: introduction pipe, 29: plate member, 30, 41, 43: lower pipe lid, 31, 31b, 31c, 31d: heater, 32, 42, 44: upper pipe lid, 33, 268: air release valve, 34: controller, 35, 35a: guide member, 36: check valve, 37: operation lever, 38: connecting rod, 39: wiring line, 40: power supply, 45, 240, 262: lid, 46, 269: connecting pipe, 47, 270: sub-container, 48: container, 49: feed-water valve, 50a, 50b: pipe, 51: power controller, 60: set screw, 70: strainer, 100: hot water heating system, 154, 265, 482: discharge port, 221, 225, 226: hole, 222a, 222b: circular pipe, 223a, 223b: joint pipe, 224: square pipe, 227, 281, 304: female screw, 228: air bubble trap, 229a: first branch hole, 229b: second branch hole, 230: flow channel switching valve, 231: user-side heat exchanger, 232: first pipe, 233: second pipe, 234: fixing unit, 235, 301, 322, 431: male screw, 236: coupling, 237: water shutoff valve, 261: tank body, 263: opening, 264, 481: suction port, 266, 321, 422, 442, 451, 483: air vent, 267, 351, 452: through-hole, 282, 352: flange, 302: joint, 303: recess, 411, 421: O-ring, 441: insertion opening, 443: gasket, 484: feed-water inlet

The invention claimed is:

1. A method for constructing a water circulation device including a water circulation circuit that circulates water heat-exchanged with a refrigerant heated by a heat pump, the method comprising:
   installing a heater in the water circulation device in contact with the water;
   depositing scale from the water on the heater by heating the heater while circulating the water in the water circulation circuit; and removing the heater from the water circulation device after the depositing such that the heater does not come into contact with the water during use of the water circulation device.

2. The method according to claim 1, wherein
the water circulation circuit includes a first heat exchanger to perform heat exchange between the refrigerant and the water, and
in the depositing, the heat pump is operated such that the refrigerant condenses at a temperature less than 60° C. in the first heat exchanger.

3. The method according to claim 2, wherein
the water circulation circuit further includes a second heat exchanger to perform heat exchange between the water and indoor air, and
in the installing, the heater is installed in a portion on a downstream side of the first heat exchanger and on an upstream side of the second heat exchanger in the water circulation circuit.

4. The method according to claim 1, wherein
a vertically upward hole that is openable and closable is formed in the water circulation circuit,
in the installing, the heater is inserted into the water circulation circuit through the hole, and
in the removing of the heater, the heater is drawn out through the hole.

5. The method according to claim 4, wherein
the water circulation circuit includes a pipe, and
the hole is formed in the pipe.

6. The method according to claim 4, wherein
the water circulation circuit includes a tank to absorb a volume change associated with a temperature change of the water, and
the hole is formed in the tank.

7. The method according to claim 4, wherein
a first end of the heater is attachable to a first lid capable of opening and closing the hole,
a second lid capable of opening and closing the hole is attached to a second end of the heater,
the first end is located on an opposite side to the second end of the heater,
the installing includes:
  inserting the heater from the first end side into the water circulation circuit through the hole;
  closing the hole with the second lid; and
  attaching the first end to the first lid before or after the inserting, and
the removing of the heater includes:
  separating the second lid from the hole;
  pulling out the heater through the hole;
  closing the hole with the first lid; and
  removing the first end from the first lid.

8. The method according to claim 4, wherein
a first lid capable of opening and closing the hole is attached to a first end of the heater, and a second lid capable of opening and closing the hole is attached to a second end of the heater,
the first end is located on an opposite side to the second end of the heater,
the installing includes:
  inserting the first lid and the heater into the water circulation circuit; and
  closing the hole with the second lid, and
the removing of the heater includes:
  separating the second lid from the hole;
  pulling out the heater through the hole; and
  closing the hole with the first lid.

9. The method according to claim 4, wherein
the water circulation device includes a first lid and a second lid capable of opening and closing the hole,
the heater has a linear shape,
an insertion opening through which the heater is passed is formed in the second lid,
an end of the heater is attachable to the first lid,
the installing includes:
  inserting the end into the insertion opening while the hole is closed with the second lid,
  attaching the first lid to the end; and
  inserting the heater through the insertion opening into the water circulation circuit, and
the removing of the heater includes:
  pulling out the heater through the insertion opening until the end reaches the hole;
  closing the hole with the first lid;
  removing the end from the first lid; and
  separating the second lid from the hole.

10. The method according to claim 7, further comprising removing air bubbles in the water circulation circuit through an air vent before and/or after the depositing,
wherein the air vent is formed in the second lid.

11. The method according to claim 10, wherein
a feed-water inlet is formed in the second lid, and
in the removing of the heater, water is supplied through the feed-water inlet into the water circulation circuit.

12. The method according to any one of claims 1 to 3 claim 1, wherein
the heater is installed in a container,
the water circulation circuit includes a pipe in which a first branch hole and a second branch hole are formed,
a flow channel switching valve is provided between the first branch hole and the second branch hole in the pipe,
the installing includes:
  generating a bypass path returning to the water circulation circuit through the first branch hole, the container, and the second branch hole in order by connecting the container to the pipe such that the first branch hole and the second branch hole communicate with each other through an inside of the container; and
  closing the flow channel switching valve, and
the removing of the heater includes:
  removing the container from the pipe;
  closing the first branch hole and the second branch hole; and
  opening the flow channel switching valve.

13. The method according to claim 1, wherein
the water circulation circuit includes a first pipe and a second pipe connectable to the first pipe,
the heater is installed in a container,
the installing includes connecting the container between the first pipe and the second pipe such that the water flows sequentially in the first pipe, the container, and the second pipe, and
the removing of the heater includes:
  removing the container from the first pipe and the second pipe; and
  connecting the first pipe and the second pipe.

14. The method according to claim 12, further comprising removing air bubbles in the water circulation circuit through an air vent before and/or after the depositing,
wherein the air vent is formed in the container.

15. The method according to claim 1, further comprising measuring an amount of calcium contained in the water in the water circulation circuit.

16. A scale removal device that removes scale of water circulating in a water circulation circuit, the water circulation circuit having a vertically upward hole that is openable and closable with a first lid and a second lid, the scale removal device comprising:
- the second lid; and
- a heater,
- wherein the scale removal device switches between a first state and a second state,
- in the first state, the hole is closed with the second lid while the first lid and the heater are disposed in the water circulation circuit, and
- in the second state, the hole is closed with the first lid while the heater and the second lid are disposed outside the water circulation circuit.

* * * * *